United States Patent Office 3,787,383
Patented Jan. 22, 1974

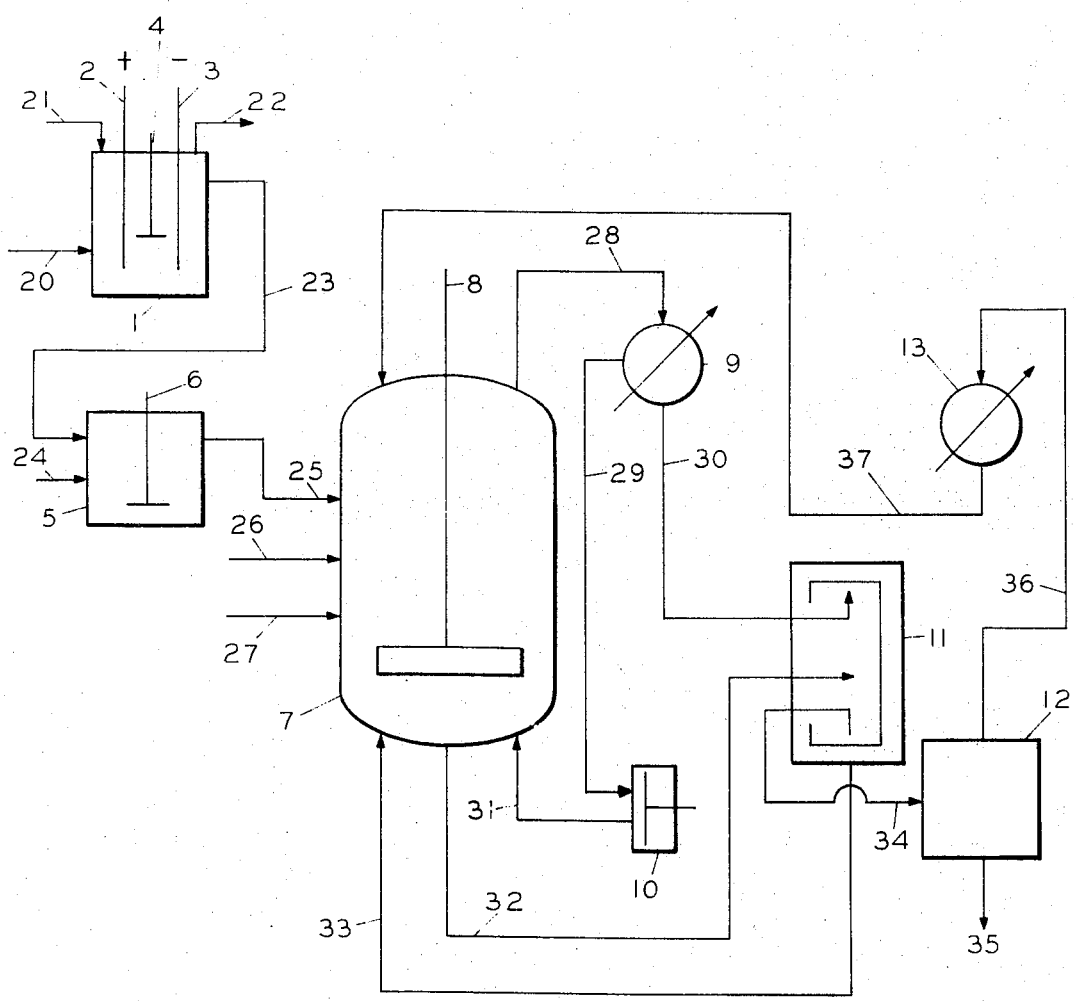

3,787,383
POLYMERIZATION OF OLEFINIC COMPOUNDS
AND CATALYSTS THEREFOR
Edward H. Mottus, Ballwin, and Morris R. Ort, Kirkwood, Mo., assignors to Monsanto Company, St. Louis, Mo.
Continuation of application Ser. No. 621,036, Mar. 6, 1967, which is a continuation-in-part of application Ser. No. 539,662, Apr. 4, 1966, both now abandoned. This application Dec. 27, 1971, Ser. No. 212,612
Int. Cl. C08f 1/28, 1/56
U.S. Cl. 260—92.8 R     14 Claims

ABSTRACT OF THE DISCLOSURE

An electrolytic process is described for making certain bis-(halometal)methanes such as bis(dichloroaluminum)-methane, $Cl_2AlCH_2AlCl_2$, which is a new compound, and these compounds can be combined with transition metal compounds such as $VOCl_3$ to make very active catalysts for polymerizing olefinic compounds such as ethylene. In the electrolytic process boron, a Group II, Group III–A or Group IV–A metal, e.g. aluminum, is used as an anode with an electrolyte such as $HOAlCl_2$ in the presence of a methylene dihalide such as $CH_2Cl_2$ or a gem dihalide which does not readily dehydrohalogenate or alkylate. It is preferred to carry out the electrolysis in the presence of ethylene or another olefinic compound to promote conductivity. Also, it is preferred that all reactants be substantially free of water, except for small known amounts of water which may be added to promote electrolysis. Also, it is preferred to blanket the electrolysis with ethylene which also serves to promote conductivity, or an inert gas to exclude moisture, oxygen and other undesirable materials. The catalysts polymerize olefinic compounds to liquid or solid polymers depending on the particular catalyst used and the olefin being polymerized. The catalysts are promoted or modified by small amounts of water or other electron donor compounds.

---

This is a continuation of application Ser. No. 621,036, filed Mar. 6, 1967, now abandoned, which application is a continuation-in-part of copending application Ser. No. 539,662, filed Apr. 4, 1966, now abandoned.

The invention relates to new catalysts and catalyst components for the polymerization of olefinic compounds, an electrolytic process for making the new catalyst components, and to a process for polymerizing olefinic compounds using these new catalysts.

The prior are related to this invention is the well-known and voluminous Ziegler catalysts and polymerization art. Typical of this Ziegler art is Belgium Pat. No. 533,362, issued May 16, 1955. The most closely related prior art to our invention is described in U.S. Pat. No. 3,247,173, issued Apr. 19, 1966, and this patent teaches the polymerization of olefinic compounds in the presence of a catalyst containing a titanium compound and a polymeric chemical reaction product of a methylene halide with a metal which is aluminum, zinc or magnesium. Also, since the filing of the parent application a publication has been made, Tetrahedron Letters No. 21, 2315–2320 (1966), which teaches the making of one of our catalyst components, namely bis(dichloroaluminum)methane, and another related publication is Emschwiller Compt. Rend. 188, 1555–7 (1929).

We have now discovered new and improved catalysts for polymerizing olefinic compounds. These catalysts have more than one component and some of these components, normally the major components as to amount, are novel compounds made by a unique process and which contributes valuable solubility characteristics to the catalysts and, in addition, the activities of the catalysts are high. This solubiliy characteristic, coupled with high activity, provides a very important commercial advantage of low catalyst residues in the polymer product and the catalyst residues are more easily extracted because of solubility or, in the case of some species of the catalysts are so active and are used in such small amounts that the catalyst residues in the polymer are insignificant as a practical matter—again this solubility characteristic contributes to lower than normal catalyst residues since more catalyst remains in the polymerization medium when this medium is separated from the polymer product. This unique process for making the novel components of the catalysts is an electrolytic process which makes the novel components in high yield, cheaply and in solution, and these components are directly usable without recovery from solution or further treatment to make the catalysts and for polymerization. Further advantages, especially for a continuous polymerization process, are that the novel catalyst components can be continuously made electrolytically and be used as made, obviating storage and stabilization problems. In this unique electrolytic process boron, a Group II, Group III–A or Group IV–A metal compound is made by electrolyzing a dihalide such as a methylene dihalide or a gem dihalide, which does not readily dehydrohalogenate or alkylate, in the presence of an electrolyte using an anode of boron, a Group II, Group III–A or Group IV–A metal element of the Periodic Table of elements.

A second component of the catalysts which are called heavy metal compounds are salts or oxides of Group III–B, IV–B, V–B, VI–B, VII–B, VIII or I–B of the Periodic Table of elements and the heavy metal compounds described in detail in the well-known Ziegler art are quite suitable as components for our catalysts. In the usual Ziegler catalysts, the heavy metal compound is reduced from its highest valence state by combination with the other catalyst component. In our catalysts which have been studied to see if the heavy metal compound is reduced, it has been found that it was not reduced and even after the polymerization was complete, the heavy metal compound had not been reduced; however, it should be understood that whether or not the heavy metal compound is reduced in our catalysts may not necessarily be a limitation for them, i.e., more work would have to be done to establish the validity of this proposition for all our catalysts.

In three copending applications of even date are described catalysts or catalyst components broadly or specifically covered by the claims of the present application. One of these, application Ser. No. 621,035 filed Mar. 6, 1967 and now U.S. Pat. 3,546,083 issued Dec. 8, 1970, teaches an electrolytic method for making complete catalysts electrolytically or a transition metal component separately; another application Ser. No. 620,670 filed Mar. 6, 1967 and now U.S. Pat. 3,516,978 issued June 3, 1970, teaches a chemical method of making complete catalysts chemically from alloys; and the third, application Ser. No. 669,306 filed Sept. 20, 1967 and now U.S. Pat. 3,509,189 issued Apr. 28, 1970, teaches a chemical method for making the non-transition component of the catalysts.

It is an object of this invention to provide new catalysts and catalyst components useful for the polymerization of olefinic compounds.

It is another object of this invention to provide a new process for making the new catalyst components of the invention.

It is another object of this invention to provide a process for polymerizing olefinic compounds using the new catalysts.

It is another object of this invention to provide a continuous process for polymerizing olefinic compounds incorporating the new electrolytic process for making the new catalyst components.

These and other objects of the invention will be apparent as the detailed description of the invention proceeds.

The catalysts of this invention are capable of polymerizing olefinic compounds and particularly α-olefinically unsaturated compounds either non-polar or polar olefinic compounds. Normally the monomers which we polymerize with our catalysts have not more than 20 carbon atoms since this includes most commercially important monomers; however, our catalysts will polymerize monomers having more than 20 carbon atoms. Our catalysts will produce solid, semi-solid or liquid polymers including oligomers depending on reaction conditions and/or the presence of catalyst modfiers, chain-breaking agents and the like. The preferred solid polymers which can be made with our catalysts have molecular weights of at least 2,000 and preferably at least 10,000; however, polymers having much higher molecular weights ranging from 20,000 to 50,000 or 100,000 and even in many cases as high as 1,000,000 to 3,000,000 or more can be made as desired. The molecular weights are those calculated in the conventional manner on the basis of the viscosity of the polymers in solution as described in the Journal Für Praktische Chemie, 2nd series, vol. 158, 136 (1941), and J.A.C.S. 73, 1901 (1951). These solid polymers generally have high density and similar uses in the plastics industry as the well-known Ziegler polymers. The semi-solid or liquid polymers are useful in adhesives, as lube oil additives, gasoline additives, and the like and in general for the same uses as are similar polymers made by conventional means.

At the present time, ethylene is by far the preferred monomer for preparing polymers. The ethylene can be homopolymerized or can be copolymerized with varying amounts particularly of the order of 2 to 50% of higher olefins such as propylene or butylene, especially the former; however, copolymers containing less than 50% ethylene can also be made. Our catalysts are especially useful for preparing the currently popular ethylene/propylene copolymer rubbers. The ethylene can also be copolymerized with butadiene and/or isoprene. Also of interest are the copolymers of butadiene and/or isoprene with styrene. Homopolymers of butadiene, especially butadiene-1,3, homopolymers of isoprene and copolymers of butadiene with isoprene can also be prepared with the catalysts of our invention. With proper adjustment of catalyst ratios either predominantly, e.g., 85% or higher, cis- or trans-polybutadiene can be made using our catalyst. Other ethylenically unsaturated hydrocarbons can also be polymerized with our catalysts and are of interest and these are propylene, butylenes, especially butene-1, isobutylene, amylenes, 1-octene, 1-dodecene, 1-heptadecene, 1-eicosene and the like. Substituted olefins can also be polymerized by our catalysts such as vinyl cyclohexene, styrene, α-methyl styrene, vinyl naphthalene, vinyl aromatic hydrocarbons generally, etc. Our catalysts are especially desirable for polymerizing styrene to high molecular weight polymers. Polyvinyl ethers can be made with our catalysts, especially homopolymers of alkyl vinyl ethers for example, ethyl vinyl ether, vinyl isobutyl ether, 2-ethylhexyl vinyl ether, etc., and copolymers of the same with ethylene and other copolymerizable ethylenically unsaturated comonomers can also be prepared. Our catalysts are especially useful for polymerizing α-olefinic compounds. A variety of polymers of the various monomers named above with each other and with other comonomers can be prepared with the catalysts of our invention and the present invention in its broadest scope includes the use of our catalysts to prepare polymers or copolymers of any olefinic compounds and even of acetylenic compounds, e.g., acetylene.

An illustrative list of other monomers which can be polymerized by our catalysts is as follows: methacrylic acid and methacrylates such as methyl methacrylate, n-butyl methacrylate, t-butyl methacrylate, 2-ethylhexyl methacrylate, lauryl methacrylate, chloroethyl methacrylate, methoxymethyl methacrylate and the like; nitrogen-containing compounds such as acrylonitrile, N-vinyl-2-pyrrolidone, dimethylaminoethyl methacrylate, vinyl pyridine, 5-methyl-2-vinyl pyridine and the like; acrylic acid and acrylates analogous to the methacrylates named above; other vinyl and vinylidene monomers such as vinyl chloride, vinyl fluoride, vinylidene chloride, vinylidene fluoride, 1-fluoro-1-chloroethylene, acrylonitrile and methacrylonitrile, vinyl acetate, vinyl propionate, vinyloxyethanol, vinyl trimethyl acetate, vinyl hexanoate, vinyl laurate, vinyl chloroacetate, vinyl stearate, methyl vinyl ketone; polyfluoro ethylene of the formula $CF_2=CXY$ where X is H, Cl or F and Y is Cl or F either alone or copolymerized with ethylene or other monomers, including tetrafluoroethylene, chlorotrifluoroethylene, trifluoroethylene, 1,1 - dichloro - 2,2 - difluoroethylene and the like; especially monomer combinations such as the following for making copolymers, ethylene/vinyl chloride, ethylene/indene, ethylene/isobutyl vinyl ether, ethylene/isoprene, ethylene/3-chloro-1-butene, ethylene/acenaphthylene, ethylene/cyclooctadiene - 1,3 or - 1,5, ethylene/vinyloxyethanol, ethylene/vinyl acetate, ethylene/cis-cyclooctene, ethylene/dicyclopentadiene, ethylene/2-ethylhexyl acrylate, ethylene/tetrafluoroethylene, ethylene/3-methylbutene-1, ethylene/methyl methacrylate, ethylene/4-methylpentene-1, ethylene/1,3-pentadiene, ethylene/1,7-octadiene, ethylene/phenylacetylene, ethylene/vinylidene chloride, acrylonitrile/isobutylene, acrylonitrile/vinyl acetate, isobutylene/vinylidene chloride, isobutylene/vinyl acetate, vinyl acetate/vinyl methyl ether, lauryl methacrylate/vinyloxyethanol, lauryl methacrylate/styrene, ethylene/propylene/1,4-hexadiene, vinyl chloride/vinyl acetate, styrene/maleic anhydride and the like; other monomers having a plurality of ethylenic bonds, especially conjugated double bonds, such as 2-chloro-butadiene, 2-fluorobutadiene, 2-phenoxybutadiene, methacrylic anhydride, ethylene glycol dimethacrylate, diethylene glycol dimethacrylate, triethylene glycol dimethacrylate, tetraethylene glycol dimethacrylate, diethylene glycol diacrylate, decamethylene glycol diacrylate, glycerol triacrylate, dimethacrylate esters of polyethylene glycols, diallyl maleate, vinyl methacrylate, allyl methacrylate, crotol methacrylate, methallyl methacrylate, diallyl phthalate, diallyl carbonate, diallyl adipate, diallyl fumarate, divinyl succinate, divinyl adipate, divinyl benzene and the like; other monomers such as fumaric and maleic acids and derivatives such as maleic anhydride, mono- and dialkyl esters of fumaric and maleic acids such as ethyl hydrogen fumarate, diethyl and dimethyl fumarate and maleate copolymerized with ethylene, vinyl chloride, styrene, methacrylates, acrylates and the like; ethylene, propylene, isobutylene, 2-ethylhexene-1 and mixed isobutylene/vinyl isobutyl ether copolymerized with maleic anhydride; copolymers of isobutylene with vinyl acetate, dimethyl fumarate and dimethyl maleate; copolymers of allyl chloride with maleic anhydride; copolymers of styrene and condensation product of maleic anhydride and ethylene glycol; copolymers of styrene with the condensation product of maleic anhydride and propylene oxide; and, copolymers of carbon monoxide, sulfur dioxide and acetylene with ethylene.

The non-transition metal compounds of our catalysts which are made by electrolyzing a dihalide in the presence of an electrolyte using as an anode boron or a Group II, III–A or IV–A metal are of the formula

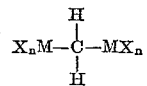

and the mono- and di-hydrohalides thereof wherein M is boron or a Group II, Group III–A or Group IV–A metal, X is a halogen element and n is one less than the valence of M; however, compounds of the formula

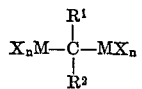

where X, n and M are as defined above, R¹ and R² taken singly are hydrogen atoms or hydrocarbon groups preferably having not more than 8 carbon atoms and preferably being aliphatic and R¹ and R² taken together with the carbon atom to which they are attached form a vinylene group in which one or both of the hydrogen atoms can alternatively be hydrocarbon groups preferably not having more than 8 carbon atoms and preferably being aliphatic are also catalyst components and can also be made by the electrolytic process provided the dihalide from which they are made does not readily dehydrohalogenate or alkylate.

In these compounds, M is Be, Mg, Ca, Sr, Ba, Ra, Zn, Cd, Hg, B, Al, Ga, In, Tl, Si, Ge, Sn or Pb, X can be chlorine, bromine, iodine or fluorine but is preferably a chlorine atom or an iodine atom. The X's can be the same or different halogen atoms, e.g., mixtures of chlorine and fluorine or chlorine and iodine atoms in the same compound. The hydrohalides, i.e., the mono- or di-hydrohalides, of chlorine, bromine, iodine or fluorine of the M compounds described above are also usable, but the hydrochlorides or hydroiodides are preferred.

Illustrative of these

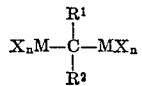

compounds are the following: $Cl_2AlCH_2AlCl_2$, $Br_2AlCH_2AlBr_2$, $I_2AlCH_2AlI_2$, $F_2AlCH_2AlF_2$, $Cl_2AlCH_2AlI_2$,

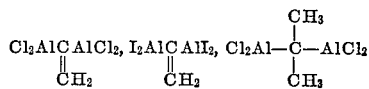

ClBeCH₂BeCl,
IBeCH₂BeI,
ClMgCH₂MgCl,
IMgCH₂MgCl,
BrMgCH₂MgBr,
ClCaCH₂CaCl,
ICaCH₂CaI,
ClSrCH₂SrCl,
ISrCH₂SrI,
ClBaCH₂BaCl,
IBaCH₂BaI,
ClRaCH₂RaCl,
IRaCH₂RaI,
ClZnCH₂ZnCl,
IZnCH₂ZnI,
ClZnCH₂ZnI,
ClCdCH₂CdCl,
ICdCH₂CdI,

ClHgCH₂HgCl,
IHgCH₂HgI,
Cl₂BCH₂BCl₂,
I₂BCH₂BI₂,
Cl₂GaCH₂GaCl₂,
I₂GaCH₂GaI₂,
Cl₂InCH₂InCl₂,
I₂InCH₂InI₂,
Cl₂TlCH₂TlCl₂,
I₂TlCH₂TlI₂,
Cl₃SiCH₂SiCl₃,
I₃SiCH₂SiI₃,
Cl₃GeCH₂GeCl₃,
I₃GeCH₂GeI₃,
Cl₃SnCH₂SnCl₃,
I₃SnCH₂SnI₃,
Cl₃PbCH₂PbCl₃,
I₃PbCH₂PbI₃.

The compounds

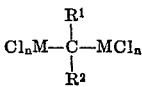

are the most preferred of our catalyst components, especially $Cl_nM$—$CH_2$—$MCl_n$, and they are all new compounds—n, M, R¹ and R² are as defined above. They are useful as catalysts for the polymerization of olefins but are also useful for other purposes such as Friedel Crafts catalysts, e.g., bis(dichloroaluminum)methane,

dissolved in methylene dichloride can be used as a catalyst to convert benzene to diphenylmethane; to promote the polymerization of propylene oxide, and to promote the polymerization of benzylchloride. Most, but not all, of the compounds of the formula

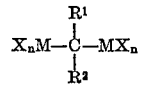

are also new, e.g., H. Lehmkuhl and R. Schaefer, Tetrahedron Letters No. 21, pp. 2315–2320 (1966) describe a chemical method for preparing $Cl_2AlCH_2AlCl_2$, however, the preparation of this compound is described in our copending application Ser. No. 539,662, filed Apr. 4, 1966, which is prior to the Tetrahedron Letters publication. Compt. Rend. 188, 1555–7 (1929) describes the chemical preparation of $IZnCH_2ZnI$ and refers to other publications which describe the preparation of $IMgCH_2MgI$ and $BrMgCH_2MgBr$.

Also useful for the same uses as the compounds

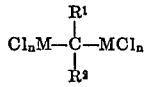

are the compounds formed by chemical reaction of two or more molecules of

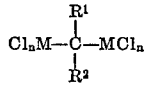

such as

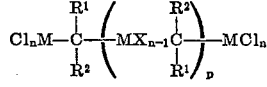

where p is an integer of 1 or more, preferably 1. A by-product of this chemical reaction is a halide of M. The preferred of these compounds are the soluble ones and *soluble* means that the compound dissolves in the corresponding

electrolytic component in an amount sufficient for polymerization, since if the compound is not soluble it is not as desirable and does not have the advantages as a polymerization catalyst component that the

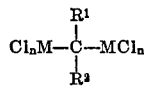

compounds have. The most preferred of these compounds are the ones were p is 0 or 1, since as p increases beyond 1 the solubility decreases and the compounds become insoluble. An example of this chemical reaction is

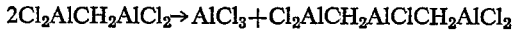

which is soluble in methylene dichloride.

The compounds

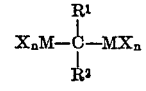

are made by electrolyzing a compound of the formula

which preferably does not readily dehydrohalogenate or alkylate and wherein $n$, $X$, $R^1$ and $R^2$ are as defined herein above using as an anode the element M.

The cathode in the electrolytic cell may be M or an inert electrode such as platinum or carbon. Actually, it may be preferred that the cathode also be M since this would allow the polarity of the cell to be changed periodically so that both electrodes would be consumed, thus lengthening the time the cell could operate without electrode change.

The liquid medium for the electrolysis cell can suitably be provided by using an excess of

over that required to make the product compounds, alternatively a diluent such as hexane or other inert organic medium can be used as at least part of the liquid medium for the cell.

In order to carry out the electrolysis an electrolyte is needed and any electrolyte that does not destroy or deactivate the catalyst can be used. The electrolyte that is preferred is $X_2MOR^3$, X and M being defined above and $R^3$ can be H, alkyl, aryl or other organic groups, hydrocarbyl being preferred, and especially organic groups having not more than 8 carbon atoms preferred.

Perhaps the most preferred electrolyte, at least when M is Al, is dichloroaluminum hydroxide ($Cl_2AlOH$), and this electrolyte can be made easily by at least two methods as follows:

(A) $AlCl_3 + H_2O \rightarrow Cl_2AlOH + HCl$ (B) $CH_3CH_2AlCl_2 + H_2O \rightarrow Cl_2AlOH + CH_3CH_3$ Five millimoles of $Cl_2AlOH$ per liter of dichloromethane is sufficient concentration for electrolysis, and although higher concentrations would seem to offer no advantage, it is possible that some reduced concentration might be more economic. $AlCl_3$ itself is equally as good an electrolyte as $Cl_2AlOH$, and aluminum chloride is dissolved in methylene dichloride by refluxing. An advantage of the aluminum chloride is that it will react with traces of moisture in the methylene dichloride to form $Cl_2AlOH$. $MnCl_2$ is also a good electrolyte and, in fact, most any metal salt will be operable as an electrolyte in the process of the invention, the more soluble salts being preferred. Tetraethyl ammonium chloride is operable as an electrolyte although is inferior to $AlCl_3$ and $Cl_2AlOH$. Water can be used as conductivity promoter for electrolytes such as $AlCl_3$ in an amount of about 0.1 to 1 mole of water per mole of $AlCl_3$ although more than this can be used.

Inert gas blanketing, e.g., $N_2$, argon, helium or the like of the electrolytic cell during electrolysis is desirable; however, it has been found that better conductivity and improved electrolysis are obtained if ethylene or other gaseous olefinic compound is used for blanketing the greater part or all of the electrolysis. It may be that the ethylene forms a complex with the cationic species of the electrolyte and thereby raises its reduction potential so the electrolyte is not lost by reduction to the metal. Problems may be caused by the presence of ethylene dissolved in the electrolyte, for example, if a complexer is used to premix the catalyst components before they are added to the reactor, some polymer is formed in the complexer which tends to foul the complexer. This problem can be solved by eliminating the complexer and charging the catalyst components directly to the reactor where complexing can be accomplished. Another solution to this problem of polymer formation in the complexer is to reflux the electrolysis solution to drive off the ethylene or to displace the ethylene by bubbling an inert gas through the electrolyzed solution.

The reactions involved for the preparation of compounds

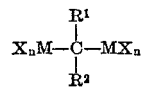

are both electrolytic and chemical. If the reactions involving Group III–A metals were truly electrolytic, three faradays of electricity would be required for each gram atom of metal anode consumed. However, in our reaction sequence only one faraday of electricity is required for each gram atom of the metal anode consumed. The remainder of reactions are chemical. The following sequence of reactions is postulated as a route to bis(dichloroaluminum)methane when dichloroaluminum hydroxide is the electrolyte.

$$3Cl_2AlOH \rightleftharpoons Cl_2AlOH^+ + Cl_3AlOH^-$$

Reaction at the anode

$$AlCl + CH_2Cl_2 \rightarrow Cl_2AlCH_2Cl$$

$$Cl_2AlCH_2Cl + AlCl \rightarrow Cl_2AlCH_2AlCl_2$$

Reactions at the cathode

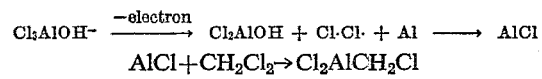

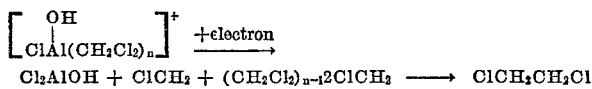

Voltage and current usage in the cell, will of course depend on the construction of the cell, the number of electrodes or electrode surface, the electrolyte and solvent combination, with the voltage being set to make the compounds at as fast a rate as is practical and economical. A competing entirely chemical reaction occurs during electrolysis if the current density is too low. The product of this chemical reaction is insoluble in dichloromethane. When the current density was 0.366 amps/dm.² or greater, no chemical reaction was observed; however, at a current density of 0.219 amps/dm.² considerable chemical reaction was observed. The current densities reported were taken from a continuous electrolysis cell, and it is possible that flow rate through the cell may also be a factor. Also, voltage is a function of distances between anode and cathode, so cell geometry will affect the absolute level of required voltage. The electricity supplied to the cell may be either DC or AC. AC may have particular advantage where both electrodes are of the same M. The alternating current can have any desired frequency. The frequency, however, should be sufficiently slow so that the electrochemically generated species can migrate from the electrodes before the polarity is changed.

The electrolysis may be carried out batchwise or as a continuous operation, the continuous operation being of particular advantage when the catalyst prepared electrolytically is used in a continuous polymerization reactor.

The electrolysis may be carried out under pressure or vacuum with appropriate cell modifications; however, atmospheric pressure operation is quite suitable. The preferred temperature is 25–40° C., however, temperatures 0 to 100° C. or even higher or lower can be used.

Aluminum alkyls and the corresponding halides and hydrides normally used in so called Ziegler catalysts present serious handling problems since they are pyrophoric in air and explode when in contact with water and many hydroxylic solvents. The compounds of this invention eliminate almost all of the hazards of handling usually associated with Ziegler catalysts. The solutions of our catalysts as prepared by electrolysis can be safely handled in air and can be decomposed with water and other hydroxylic solvents since they are not pyrophoric and react mildly with hydroxylic solvents.

While the electrolysis solutions of this invention can be handled safely in the presence of air and hydroxylic solvents, it is desirable to handle them in inert atmospheres since a loss of catalytic activity results when they are in contact with water or other hydroxylic solvents.

The preferred electrolytic catalyst component is bis-(dichloroaluminum)methane. This compound is not easily isolated without decomposition from the electrolyte solution in which it is made and this is no real disability since it is conveniently used as a catalyst component in the solution in which it is made. These electrolytic solutions of bis(dichloroaluminum)methane tend to lose some activity on standing; however, if the solution is refluxed for about one-half hour to drive off excess ethylene and possibly HCl, the stability is improved.

The usual concentration in which bis(dichloroaluminum)methane is prepared is about 15 millimoles per liter of solvent. Concentrations of 30 millimoles per liter have been prepared without problem and the upper limit on concentration has not been established.

The second or heavy metal or transition metal compound component of the catalysts is disclosed in many patents and publications. Probably the preferred group of second components is disclosed in Belgium Pat. No. 533,362, issued May 16, 1955, to Ziegler which discloses metal compounds from the left-hand column, i.e., the B column, of the 4 to 6th groups of the periodic system of elements, including thorium and uranium; however, very active polymerization catalysts have been made using Groups VII-B and Group VIII metal compounds and Groups I-B and III-B also are usable; i.e., compounds of the following metals are usable; Sc, Y, La, Ce, Pr, Nd, Pm, Sm, En, Gd, Tb, Dy, Ho, Er, Tm, Yb, Lu, Ac, Th, Pa, U, Np, Pu, Am, Cm, Bk, Cf, Es, Fm, Md, No, Lw, Ti, Zr, Hf, V, Nb, Ta, Cr, Mo, W, Mn, Tc, Re, Fe, Ru, Os, Co, Ph, Ir, Ni, Pd, Pt, Cu, Ag and Au. Furthermore, it is preferred to use metal compounds in the highest oxidation state of the metal; however, metal compounds in lower oxidation states are usable. Preferred salts are the halides and especially the chlorides and iodides; however, mixed halide and cyclopentadienyl compounds are very suitable in being more soluble in inert polymerization medium. An especially preferred class of heavy metal titanium compounds are the compounds of the formula $(R^4Z)_m TiX'_{m-4}$ wherein $R^4$ is a hydrogen atom or an organic group, e.g., alkyl, alkenyl, alkynyl, cycloalkyl, cycloalkenyl, cycloalkynyl, arakyl, alkaryl, aryl and heterocyclic, particularly hydrocarbyl, and these groups will normally not have more than 30 carbon atoms, with alkyl having 4 to 20 carbon atoms being especially suitable. X' is a halogen atom, especially chlorine, bromine or iodine atoms. The $m$ is an integer from 1 to 4. Z is oxygen, sulfur, selenium, tellurium, or an $NR^6$ group wherein $R^6$ is defined in the same manner as $R^4$. Another class of useful compounds are complexed titanium compounds of the formula

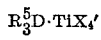

wherein D is a nitrogen, phosphorus, arsenic, antimony or bismuth atom and oxide or sulfide derivatives of phosphorus, arsenic or antimony, i.e., complexes of the formulas

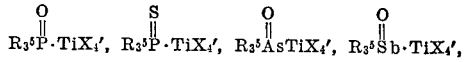

and the like wherein $R^5$ is defined the same as $R^4$ and X' is as defined above. However, other metal compounds such as the oxyhalides, acetylacetonates, etc. are also usable. Illustrative examples of suitable second components are as follows:
hydroxytitanium trichloride,
methoxytitanium trichloride,
ethoxytitanium trichloride,
n-propoxytitanium trichloride,
isopropoxytitanium trichloride,
isobutoxytitanium trichloride,
t-butoxytitanium trichloride,
n-butoxytitanium trichloride,
di-n-butoxytitanium dichloride,
tri-n-butoxytitanium chloride,
tetra-n-butoxytitanium,
n-butoxytitanium triiodide,
di-n-butoxytitanium diiodide,
tri-n-butoxytitanium iodide,
n-butoxytitanium bromide,
di-n-butoxytitanium dibromide,
tri-n-butoxytitanium bromide,
n-dodecyloxytitanium trichloride,
n-hexadecyloxytitanium trichloride,
n-dodecylthiotitanium trichloride,
n-hexadecylaminotitanium tetrachloride,
n-$C_4H_9PH_2TiCl_4$,
n-$C_4H_9BiH_2TiCl_4$,
n-$C_4H_9AsH_2TiCl_4$,
n-$C_4H_9SbH_2TiCl_4$,
n-$C_4H_9SeTiCl_3$,
n-$C_4H_9TeTiCl_3$,
phenoxytitanium trichloride,
cyclohexyloxytitanium trichloride,
benzyloxytitanium trichloride,
o-pyridyloxytitanium trichloride,
ethenyloxytitanium trichloride,
ethynyloxytitanium trichloride,
3-cyclohexenyloxytitanium trichloride,
3-cyclohexynyloxytitanium trichloride,
titanium tetrachloride,
titanium trichloride,
titanium tetraiodide,
titanium triiodide,
titanium tetrabromide,
titanium tetrafluoride,
zirconium acetylacetonate,
thorium acetylacetonate,
uranium tetrachloride,
vanadium III acetylacetonate,
chromyl chloride ($CrO_2Cl_2$),
chromium acetylacetonate,
tungsten hexachloride,
molybdenum acetylacetonate,
tantalum pentachloride,
zirconium tetrabromide,
$K_2TiF_6$,
titanium oxide,
zirconium oxide,
alkoxyhalotitanium oxides such as n-$C_4H_9OTi(O)Cl$,
titanium oxychloride ($Cl_2TiO$),
$Cl_3TiOTiCl_3$,
$Cl_3TiOTi(Cl)_2OTiCl_3$,
$(CH_3)_3SiOTiCl_3$,
$(CH_3)_3SiOTiCl_2(OCH_3)$,
$(CH_3)_3SnOTiCl_3$,
$(CH_3)_3GeOTiCl_3$,
$(CH_3)_3PbOTiCl_3$,
zirconium tetrabutyl,
vanadium tetrachloride,
vanadium trichloride,
dicyclopentadienyl titanium dichloride,
cyclopentadienyl titanium trichloride,
dicyclopentadienyl vanadium dichloride,
vanadium oxychloride ($VOCl_3$), which is one of the most active catalyst components, polymeric compounds, e.g., those containing titanium and oxygen bonds, and the like. Also, mixtures of any two or more of the above-named heavy metal compounds will sometimes be desirable rather than using just a single compound, e.g., $TiCl_4+TiI_4$, $TiBr_4+TiI_4$, or mixed components such as $TiF_2Cl_2$, $TiCl_2I_2$ and the like.

Illustrative compounds of metals of Group III–B are the following: $ScCl_3$, $YCl_3$, $LaCl_3$, $AcCl_3$, $CeCl_3$, $ThCl_3$, $PrCl_3$, $PaCl_3$, $NdCl_3$, $UCl_3$, $PmCl_3$, $NpCl_3$, $SmCl_3$, $PuCl_3$, $EuCl_3$, $AmCl_3$, $GdCl_3$, $CmCl_3$, $TbCl_3$, $BkCl_3$, $DyCl_3$, $CfCl_3$, $HoCl_3$, $EsCl_3$, $ErCl_3$, $FmCl_3$, $TmCl_3$, $MdCl_3$, $YbCl_3$, $NoCl_3$, $LuCl_3$, $LwCl_3$, the other halides, especially iodides, of these Group III–B metals, the acetylacetonates thereof, the cyclopentadienyl halides, especially chlorides, or the oxyhalides, especially chlorides of the Group III–B metals.

Illustrative compounds of metals of Group I–B are the following: $CuCl_3$, $CuCl_2$, $CuCl$, $AuCl_3$, $AuCl_2$, $AgCl$, the other halides, especially the iodides of these metals, the acetylacetonates thereof, the cyclopentadienyl halides, especially chlorides thereof, or the oxyhalides, especially oxychlorides of the Group I–B metals.

Illustrative of the compounds of metals of Group VII–B are the following: $MnCl_3$, $MnCl_2$, $TcCl_5$, $ReCl_5$, the other halides, especially iodides of these metals, the acetylacetonates thereof, the cyclopentadienyl halides, especially chlorides, or the oxyhalides, especially chlorides of these Group VII–B metals.

Illustrative compounds of metals of Group VIII are the following: $FeCl_3$, $FeCl_2$, $CoCl_3$, $NiCl_3$, $RuCl_3$, $OsCl_4$, $PhCl_3$, $IrCl_3$, $PdCl_2$, $PtCl_2$, $PtCl_4$, $PdCl_4$, the other halides, especially iodides of these metals, the acetylacetonates thereof, the cyclopentadienyl halides, especially chlorides, or the oxyhalides, especially chlorides of these Group VIII metals.

It appears that the most active heavy metal compounds to use with bis(dichloroaluminum)methane, especially for polymerizing ethylene, are those transition metal compounds with electron donating groups such as:

$HOTiCl_3$,
$(HO)_2TiCl_2$,
$CH_3OTiCl_3$,
$C_{12}H_{25}OTiCl_3$,
$VOCl_3$,
vanadium acetylacetonate,
chromium acetylacetonate,
iron acetylacetonate,
manganese acetylacetonate,
nickel acetylacetonate,
cobalt acetylacetonate,
vanadyl acetylacetonate,
chromyl chloride,
$n-C_{18}H_{37}OVCl_3$,
$(n-C_4H_9O)_2VCl_2$,
$(n-C_3H_7O)_3VCl$,
$V_2OCl_3 \cdot (OC_2H_5)_3$,
$VCl_2(OCH_3)_2 \cdot C_2H_5OH$,
$(n-C_{12}H_{25}O)_2VOCl$,
$\phi_3P \cdot VOCl_3 (\phi=\text{phenyl})$,
$(C_2H_5O)_3VO$,
$(\phi_3P)_2 \cdot VOCl_3$,
$C_{12}H_{25}OVOCl_2$,
$(C_2H_5)_3N \cdot VOCl$ and the like.

While the catalysts of this invention can be prepared by a variety of procedures, the simplest and perhaps the most effective is to add the heavy metal compound to the non-transition element compound or vice versa, preferably in the presence of an inert solvent or diluent. The mole ratio of non-transition element compound to heavy metal compound or stated another way, the mole ratio of the non-transition element to heavy metal element can vary over a wide range, suitable molar ratios of non-transition element to heavy metal element being in the range of 0.1:1 to 10:1 on up to 1000:1 or higher, with the preferred ratio being 0.3:1 to 200:1. The optimum ratio of components will vary with the particular components involved and the olefinic compound being polymerized. Suitably, the inert solvent can be the solvent or diluent in which the non-transition element compound was prepared by electrolysis. It is preferred to mix, suitably by mechanical stirring or otherwise, the catalyst components as they are added one to the other, and cooling of the mixture can be used, if desired, especially if a substantial exothermic reaction occurs. It can also be desirable to age the catalyst from a few minutes to an hour or even a number of hours before using for polymerization.

A third component will be desirable for use with our catalysts sometimes when it is desired to make polymers which are more stereospecific. For example, a catalyst made by mixing $Cl_2AlCH_2AlCl_2+TiCl_4+AlI_3$ or other inorganic iodide as described in U.S. 3,222,347.

The catalyst is sensitive to various poisons, among which may be mentioned oxygen, water, carbon dioxide, carbon monoxide, acetylenic compounds such as acetylene, vinyl acetylene, alcohols, esters, ketones, aldehydes, and the like, although the extent to which a given quantity will inhibit catalyst activity will be greatly dependent on the particular material. For this reason, suitable precautions should be taken to protect the catalyst and the reaction mixture from such materials. Certain of the catalysts will not be poisoned to the same degree as other of the catalysts and this will depend somewhat on the mole ratio of the non-transition element compound to the heavy metal compound. However, the activity of some of our catalysts will even be promoted by a limited amount of these compounds. The monomers and diluents or solvents, if used, need not be pure so long as they are reasonably free from poisons. It is well to protect the catalyst during preparation, storage, and use by blanketing with an inert gas, e.g., nitrogen, argon or helium. However, in other instances, blanketing with the monomer being polymerized is as suitable or more preferable than blanketing with an inert gas.

As in the case of Ziegler catalysts, minor amounts of third components to modify catalyst activity can be added to our catalysts. Modify means that the catalyst activity may be either increased (promoted) or decreased by these third components, and/or the third components may also have an effect on the properties of the polymer produced from the catalyst. As an alternative to adding the modifier to the prepared catalyst, the modifier can be added to the heavy metal compound prior to the time the heavy metal compound is added to the non-transition element compound; however, normally it will be preferred to add the modifier after the non-transition element compound and the heavy metal compound have been added together to form our catalyst. One such modifier is a thiophenol as described in U.S. Pat. 3,009,908. This thiophenol should be added in an amount sufficient to modify the catalyst activity but insufficient to kill the catalyst activity, preferably in the range of 0.1 to 2 moles of thiophenol per mole of non-transition element compound in the catalyst. Another suitable modifier is a mercaptan as described in U.S. Pat. 2,996,459, and this modifier can be added to our catalyst in a similar manner as the thiophenol in an amount preferably in the range of 0.1 to 1.5 moles of mercaptan to non-transition element compound, insufficient to kill the catalyst activity. Another suitable modifier is a phenol as described in U.S. Pat. 3,150,122, and this modifier can be added to our catalyst in a similar manner as the thiophenol in an amount preferably in the range of 0.1 to 5 moles per mole of non-transition element compound, sufficient modifier being added to change the activity of the catalyst but insufficient to kill the catalyst. Other suitable modifiers are reactive organic oxygen compounds such as alcohols, ketones, aldehydes and organic acids as described in U.S. Pat. 3,163,611 which can be added to our catalysts in a similar manner as the thiophenols in an amount preferably in the range of 0.1 to 1.5 moles of organic compound per mole of non-transition compound, sufficient modifier being added to change the activity of the catalyst but insufficient to kill the catalyst activity. Another suitable modifier is a strong acid such as described in copending application Ser. No. 760,858, filed Sept. 15, 1958, and this strong acid modifier can be added to our catalysts in a similar manner as the thiophenols in an amount preferably in the range of 0.5 to 3 moles of strong acid per mole of non-transition element compound, sufficient modifier being added to change the catalyst activity but not kill the activity, and hydrochloric acid is one of the preferred species of strong acids although the other hydrogen halide acids such as hydrobromic, hydroiodic and hydrofluoric acid, as well as sulfuric, etc., can be used as modifiers. Water is another suitable modifier for our catalysts, the use of water as a modifier is described in U.S. Pat. 3,184,416 for Ziegler catalysts, and water can be added to modify the activity of our catalysts in a similar manner as thiophenol in an amount in the range of 0.01 to 2.0 moles of water per mole of non-transition element compound, sufficient water being used to change the catalyst activity but not kill it; however, for our catalysts, it is preferred to use about 0.1 to 1.5 moles of water per mole of non-transition element compound going to make up the catalyst although more than this can be used. In addition to water, alcohols, phenols, mercaptans, thiophenols, aldehydes and the like, which are electron donating compounds useful as modifiers for our catalysts, other electron donating compounds such as amines, arsenes, stibenes, phosphines and the like are also useful as modifiers or promoters for our catalysts and should be used in similar amounts, i.e., in the range of about 0.01 to 3 moles per mole of non-transition element compound, sufficient amount being used to modify or promote, but not kill, catalyst activity. Theory regarding electron-donating compounds is discussed in Inorganic Chemistry by Kleinberg, Argersinger and Griswold, p. 218 (1960). The method of adding the catalyst modifiers is not critical; however, preferred methods of adding are to add the modifier to the catalyst after the two main components have been added together, to add the modifier to the heavy metal component, or to make the heavy metal component of the catalyst with the modifier incorporated therein by chemical reaction. The third components listed above in this paragraph are as indicated in the previous paragraph catalyst poisons and if added to the catalyst in sufficiently large quantities will completely kill catalyst activity; however, if added to the catalyst in small controlled quantities as indicated in this paragraph, they modify or promote catalyst activity and also the properties of the polymers produced from the modified catalysts. Hydrogen has been found to be effective as a catalyst and/or polymer modifier, especially in the presence of $VOCl_3$ catalyst component during polymerization of ethylene to raise the melt index of the polyethylene. Acetylene, like hydrogen, can be used as a catalyst and/or polymer modifier, e.g., 200 to 300 p.p.m. of acetylene in ethylene will give polyethylene of modified properties. Another type of additives for the catalysts of the invention is a non-ionic surfactant which tends to stabilize the catalyst and prevent loss of catalyst activity with age as indicated in U.S. Pat. 3,060,132 and the non-ionic surfactant is preferably added to the catalyst in an amount in the range of 0.1 to 10% by weight based on the catalyst.

Normally, catalysts of the invention will be used for polymerization dissolved or suspended in inert organic liquids such as the liquids in which the catalysts were prepared or in the presence of other added solvent. Such solvents for polymerization can suitably be saturated aliphatic and alicyclic, aromatic hydrocarbons and halogenated hydrocarbons. By way of example can be mentioned liquefied propane, iso-butane, normal butane, n-hexane, the various isomeric hexanes, n-heptane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, any of the xylenes, cumene, Decalin, ethylene dichloride, chlorobenzene, carbon tetrachloride, chloroform, dichloromethane and o-dichlorobenzene. In some instances, it is also advantageous to prepare the catalyst in the presence of a monomer, or even the monomer to be polymerized.

Polymerization can readily be effected in the presence of any of the classes of solvents and specific solvents just named, or mixtures thereof. If the proportion of such solvents is kept low in the reaction mixture, such as from 0 to 0.5 part by weight inert organic solvent (i.e. inert to the reactants and catalysts under the conditions employed) per one part by weight of total polymer produced, solvent recovery steps are obviated or minimized with consequent advantage. It is often helpful in obtaining efficient contact between monomers and catalysts in aiding removal of heat of reaction to employ larger amounts of solvent, for example, from 5 to 30 parts or more by weight of solvent per one part by weight of total polymer produced. These inert solvents, which are solvents for the monomers, some or all of the catalyst components and some of the polymers, but are non-solvent for many of the polymers, for example polyethylene, can also properly be termed inert liquid diluents or inert organic liquids.

The amount of catalyst required is dependent on the other variables of the particular polymerization reaction and/or monomer being polymerized and although amounts as small as 0.00005 or less weight percent based on total weight of monomers charged are sometimes permissible, it is usually desirable to use somewhat larger amounts, such as from 0.0001 up to 2 to 5% or considerably higher, say up to 20%, depending on the monomer or monomers being polymerized, the particular catalyst components, the presence or absence of solvent, the temperature, pressure and other reaction conditions. When polymerization is effected in the presence of a solvent a catalyst to solvent volume ratio may vary widely at from about $10^{-3}$ grams per liter to 5 grams per liter. By using as small an amount of catalyst as is economically feasible, problems of removing catalyst from polymer product are minimized or obviated.

The polymerization can be effected over a wide range of temperatures, again the particular preferred temperature being chosen in accordance with the monomer, pressure, particular catalyst and other reaction variables. For many monomers, from room temperature down to say —40° C. or even lower, are suitable and in many cases it is preferred that the temperature be maintained at below about 35° C. However, for other monomers, particularly ethylene, higher temperatures appear to be optimum, say from 50 to 90° C. Temperatures ranging up to 100° C. and higher are generally satisfactory for polymerization with our catalyst.

The pressure at which the polymerization is carried out is dependent upon the chosen monomer, or monomers, as well as other variables. In most instances the polymerization is suitably carried out at atmospheric pressure or higher. Although sub-atmospheric pressures are permissible there would seldom be any advantage. Pressures ranging from atmospheric to several hundred or even many thousand pounds per square inch gauge, e.g., 5,000 p.s.g. and higher are suitable. Actually, for the pressure polymerizations, pressures from 2 to 10 atmospheres are sufficient and preferable in polymerizing ethylene. While high pressures are not required in order to obtain the reaction, they will have a desirable effect on the reaction and, in some instances, on polymer quality. A choice of whether or not to use an appreciably elevated pressure will be one of economic and practical consideration, taking into account the advantages that can be obtained thereby.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of more rapid reactions with more active catalysts, means can be provided for refluxing monomer and solvent, if any of the latter is present, and thus remove the heat of reaction. In any event, adequate means should be provided for dissipating the exothermic heat of polymerization, if necessary. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which can be contacted externally with suitable cooling medium to maintain the desired reaction temperature.

The time of contact of the monomer with catalyst will vary depending on the other reaction conditions, the monomer or monomers being polymerized, the particular catalyst being used, the degree of polymerization desired, etc. Generally, the time will vary from a few minutes to a number of hours; however, it can in some cases run to a number of days.

The polymer can be recovered from the total reaction mixture by a wide variety of procedures, chosen in accordance with the properties of the particular polymer, the presence or absence of solvent, and the like. It is generally quite desirable to remove as much catalyst from the polymer as possible and this is conveniently done by contacting the total reaction mixture or the polymer after separation of the solvent, with a hydrocarbon or halogenated hydrocarbon, with methanolic hydrochloric acid, with an aliphatic alcohol such as methanol, isobutanol, secondary butanol, or by various other procedures or combinations of these catalyst removing agents. If the polymer is insoluble in the solvent it can be separated therefrom by filtration, centrifuging or other suitable physical separation procedures. If the polymerization is carried out in the presence of a solvent, as will normally be the case, and the polymer is insoluble in the solvent most of the catalyst will be removed from the polymer by filtration to remove the solvent with catalyst dissolved therein, then washing the polymer one or more times with the polymerization solvent and/or other medium is a particularly desirable method of reducing further the catalyst level in the polymer. After washing the polymer with the polymerization medium, it may be desirable to kill the activity of any catalyst remaining in the polymer by treating the polymer with an aliphatic alcohol such as methanol. If the polymer is soluble in the solvent, it is advantageously precipitated by adding to the solution a non-solvent usually being an organic liquid miscible with the solvent but in which the polymer to be recovered is not readily soluble. Of course, any solvent present can also be separated from the polymer by evaporation of the solvent, care being taken to avoid subjecting the polymer to a temperature so high as to cause deterioration of the polymer in such an operation. If a higher boiling solvent is used, it may be desirable to finish any washing of the polymer with a low boiling material such as one of the aliphatic alcohols or hexane, pentane, etc. which aids removal of the higher boiling materials and permits the maximum removal of extraneous materials during the final polymer drying step. Such a drying step is desirably effected in a vacuum at moderate temperatures, preferably well below 100° C.

For conventional catalysts such as the Ziegler catalysts, treatment of their polymer products to remove catalyst residues is an expensive and necessary operation. The catalysts of the present invention have extremely high catalyst activity giving very high yields of polymer product per gram of catalyst, and also these catalysts have a high degree of solubility normally being soluble in the methylene dihalide in which they are made. These catalysts of the invention in general are more soluble than the Ziegler catalysts which are usually used as suspensions rather than solutions for polymerization, and at least the chlorides will usually be soluble in the methylene dichloride in which they are made in sufficient concentrations for polymerization, although obviously they can be used as suspension as are the Ziegler catalysts. As a result, small amounts of catalyst can be used and most of the catalyst is removed from the polymer in the liquid polymerization solvent when the solvent is separated from the polymer product. As a practical matter, the catalyst residues in the polymer products are insignificant and no further treatment of the polymer product to remove catalyst residues is usually necessary. Thus, our polymer product can normally be recovered inexpensively by any one of a number of alternative methods, for example: (1) the polymer slurry from the polymerization reactor can go directly to a drier where the liquid polymerization medium, such as hexane or methylene dichloride, is evaporated off and the dried polymer finished product is produced, (2) most of the liquid can be removed from the polymer slurry in a centrifuge or filter and then the balance can be removed in a drier, or (3) most of the liquid can be removed in the centrifuge or filter, the polymer cake can be washed on the centrifuge or filter to further reduce catalyst levels in the polymer and then the polymer cake can be dried. Normally, when using a Ziegler catalyst such as $Al(C_2H_5)_3+TiCl_4$ the polymer would have to be subjected to a multistage washing technique such as described in U.S. 3,074,921 to reduce catalyst levels to an accepted level.

The invention will be more clearly understood from the following detailed description of specific examples thereof read in conjunction with the accompanying drawing wherein a continuous process for producing solid ethylene polymer is described. Pumps and valves have not been shown in the attached drawing since it is intended to be a flow diagram and startup of the process is not described but rather operation after the process has been lined out and is operating continuously.

Vessel 1 is an electrolytic cell, 2 is an aluminum anode, 3 is an aluminum cathode and stirrer 4 is provided for agitation. Line 21 is for the purpose of introducing ethylene to blanket the reaction in the electrolysis cell and line 22 is for the purpose of venting ethylene. Into the electrolysis cell through line 20 is introduced a preelectrolysis solution consisting of methylene dichloride, aluminum trichloride and an equimolar amount of water based on the aluminum trichloride. The ethylene introduced to the electrolysis cell serves not only to blanket the reaction but also to promote the conductivity in the cell. The direct current flowing through the cell is adjusted to a sufficiently high level to avoid the formation of any substantial amounts of strictly chemical catalysts.

Bis(dichloroaluminum)methane made in the electrolytic cell is sent via line 23 to complexer 5 which is provided with a stirrer 6. Through line 24 $VOCl_3$ dissolved in methylene dichloride is introduced to the complexer and the two components of the catalysts are stirred in the complexers for about 5 minutes before being introduced to the polymerization reactor. It is preferred that the bis-(dichloroaluminum)methane dissolved in methylene dichloride be substantially purged of ethylene by nitrogen or by refluxing prior to introduction into the complexer to avoid formation of polyethylene in the complexer.

Catalyst is charged via line 25 to polymerization vessel 7 which is agitated by stirrer 8. Through line 26 ethylene, containing about 20 volume percent hydrogen, is continuously charged to vessel 7 and through line 27 makeup hexane is charged to vessel 7. From the top of the polymerization vessel through line 28 ethylene which has not been polymerized plus some vaporized dichloromethane and hexane flow to condenser 9. From condenser 9 gaseous ethylene goes through line 29 to compressor 10 which delivers the ethylene back to polymerization vessel 7 through line 31. Through line 30 condensed hexane and methylene dichloride from condenser 6 go to enclosed basket centrifuge 11 for the purpose of washing centrifuged polyethylene cake. Alternatively, if it is decided not necessary or desirable to wash the polyethylene cake in the centrifuge, the condensed hexane and methylene dichloride can be returned directly to the polymerization vessel.

From the bottom of polymerization vessel 7 a slurry of polyethylene in hexane and methylene dichloride is taken through line 32 and introduced to centrifuge 11. From centrifuge 11, via line 33, hexane and methylene dichloride containing catalyst which has been separated from the polyethylene is returned to the polymerization vessel, and under such conditions only makeup catalyst need be added to the polymerization vessel via line 25. Alternatively, if it is not desired to re-use the catalyst recovered from the centrifuge, the hexane and methylene dichloride containing the catalyst can be distilled to remove the catalyst, the solvent condensed and returned to the polymerization vessel.

The polyethylene separated from the slurry in centrifuge is withdrawn from the centrifuge via line 34 and goes to dryer 12. In dryer 12 the hexane and methylene dichloride remaining with the polyethylene are evaporated and taken via line 36 to condenser 13. The condensed methylene dichloride and hexane from condenser 13 are returned to the polymerization vessel via line 37. From dryer 12 the dried polyethylene product is removed via line 35. An alternative method of operating is to bypass centrifuge 11 with the slurry in line 32 and charge the slurry directly to dryer 12. In these continuous processes, methylene dichloride introduced into the system with fresh catalyst would build up over a period of time and it might be desired eventually to purify the solvent in the system by distillation to reduce the methylene dichloride level; however, methylene dichloride is as good a polymerization medium as hexane.

EXAMPLE 1

To a 250 ml. flask enclosed in a nitrogen atmosphere box was added 0.15 g. of sublimed, anhydrous aluminum chloride ($AlCl_3$). Then to the flask was added 200 ml. of anhydrous dichloromethane using a nitrogen blanket. The aluminum chloride was dissolved in the dichloromethane and a clear colorless solution resulted.

A glass electrolysis vessel was prepared having a nitrogen or other gas inlet and outlet and a water condenser outlet at the top. The electrodes consisted of aluminum foil concentric hollow cylinders, the cathode being of smaller diameter and being located within the anode. A Teflon coated magnetic stirring bar was provided for agitation of the electrolysis cell. Each component of the cell was cleaned and dried before assembling, then purged with nitrogen after assembly.

To the electrolysis cell was then added 100 ml. of the aluminum chloride/dichloromethane solution described above. The power supply was turned on and electrolysis was carried out for a period of three hours. Voltages were increased from 250 to 500 volts during the run in an attempt to maintain a constant 50 milliamps current; however, by the end of the run the current had dropped to 30 milliamps. All during the run nitrogen flowed through the cell maintaining a nitrogen blanket. At the end of the run 10 ml. of additional dichloromethane was added to make up losses during electrolysis.

The amount of electricity used in the electrolysis was determined to be 3.6 milli (m) faradays. Anode loss determined by weighing before and after electrolysis was 0.1234 g. (4.6 mmoles). There was an insignificant weight gain for the cathode.

The electrolyzed solution was then added to the polymerization vessel which already contained 0.5 g. (2.0 mmoles) of dicyclopentadienyl titanium dichloride. The contents of the polymerization vessel were stirred and ethylene was passed through the mixture for 1.0 hour. At the end of the 1.0 hour of polymerization, the polymerization mixture was quenched with methanol by adding the polymerization mixture to about 250 ml. of methanol. The polymer product precipitated and was separated by filtration. Dry polymer yield was 1.62 g. The polymer showed crystallinity and it melted at 125–126° C. The polymer had a specific viscosity of 0.025 which calculated to a molecular weight of approximately 6,500. It was later discovered that in some of these early runs all of the reactants were not as dry as desirable, although attempts were made to exclude water except in controlled amounts, so these runs show operability of the process but not necessarily optimum conditions.

EXAMPLE 2

This example describes an experiment in which methanol was added to the aluminum chloride solution in dichloromethane to provide the electrolyte solution. 0.15 g. of aluminum chloride in 200 ml. of methylene dichloride was prepared and 0.045 ml. of methanol was added. This electrolyte solution then has a 1 aluminum:1 methoxy molar ratio. The ingredients were mixed until all the aluminum chloride had dissolved and a homogeneous solution resulted.

The electrolyte solution is electrolyzed and used to polymerize ethylene. This experiment was carried out in similar equipment and in a similar manner to the experiment of Example 1. 100 ml. of the electrolyte solution was added to the electrolysis cell. The electrolysis was carried out with nitrogen blanketing being changed to ethylene blanketing after six minutes of electrolysis. 1.94 mfaradays were used during the electrolysis and 1.99 mmoles of aluminum were removed from the anode. During electrolysis 0.0519 amp.-hrs. of electricity were used.

After the electrolysis 0.5 g. of dicyclopentadienyltitanium dichloride was added to the electrolyzed solution in a polymerization vessel. Polymerization was carried out for one hour in similar equipment and similar manner to Example 1 and the polymerization mixture was quenched in the usual manner with methanol. The yield of polymer was 2.07 g. and the polymer had a melting point between 129 and 131° C. The specific viscosity of the polymer was about 0.071 which calculates to a molecular weight of 23,000.

EXAMPLE 3

The following example describes a treatment of the polymer to remove the catalyst therefrom. A stock electrolysis solution having molar ratio of ¾ $H_2O$:1 $AlCl_3$ in $CH_2Cl_2$ was used in this experiment in the electrolysis cell. Electrolysis was carried out in a similar manner to Example 1. 1.03 mmoles of aluminum were lost from the anode. The electricity used in the electrolysis was 1.02 mfaradays. Nitrogen blanketing was used during entire electrolysis.

Polymerization was carried out in a similar manner to Example 1. The titanium compound used was dicyclopentadienyltitanium dichloride with a Ti to Al ratio of 0.9/1.0. After the polymerization was completed the polymerization mixture was transferred under nitrogen to a 1 liter separatory funnel and 100 ml. of additional methylene dichloride was added. After shaking the mixture, the polymer floated on top and the liquid solution was drained from the polymer. The polymer was then washed in the separatory funnel with eight separate 25 ml. portions of methylene dichloride. Finally the polymer was washed with about 500 ml. of methanol. The polymer was then filtered and dried to constant weight to give 1.43 g. of polymer having a melting point of 128.5–132.5° C. A sample of the polymer was submitted for titanium and aluminum analysis and the polymer was found to contain 15 p.p.m. of aluminum and 18 p.p.m. of titanium.

EXAMPLE 4

This experiment describes the polymerization of ethylene using the electrolytic catalyst plus cyclopentadienyltitanium trichloride as the titanium source. This experiment was carried out in a similar manner to Example 1, except as indicated below. The amount of water was 0.75 $H_2O:1$ $AlCl_3$ molar ratio in the electrolyte and in the electrolysis a nitrogen blanket was used during the entire electrolysis. The electric current used was 1.03 mfaradays. 1.48 mmoles of aluminum was lost from the anode.

The aluminum/titanium ratio was 2.1/1 with cyclopentadienyl titanium trichloride being the titanium compound used. The polymerization was for one hour as usual and the yield of polymer was 5.11 g. having a melting point of 130–132° C.

EXAMPLE 5

This example describes the use of dicyclopentadienyl vanadium dichloride rather than the corresponding titanium compound with an electrolyzed solution to polymerize ethylene. The solution prepared for electrolysis was made up as follows: 0.268 g. (0.002 mole) of freshly sublimed aluminum chloride and 36 ml. (0.002 mole) of distilled water were added to 400 m. of methylene dichloride which had been carefully purified by distillation and drying. Then 100 ml. of this electrolysis solution was added to the electrolysis cell using nitrogen blanketing. Ethylene was bubbled through the electrolysis cell both before and during the electrolysis. The time of the electrolysis was 64 minutes and about 50 milliamps constant current was maintained during the electrolysis. An additional 8 ml. of dry methylene dichloride was added after 45 minutes of electrolysis. During the electrolysis, 2.0 mfaradays of electricity were used. The aluminum loss from the anode was 0.0433 g.

To the electrolyzed solution was added 0.16 mmole (0.04 g.) of dicyclopentadienyl vanadium dichloride $Cp_2VCl_2$ (to give an Al/V molar ratio of 10). After 10 minutes of stirring with nitrogen blanketing the vanadium compound was still not in solution, however, ethylene was added to start the polymerization. Polymerization was continued for two hours after which time the polymerization mixture was quenched and the polymer worked up in the usual fashion. Yield of polymer was 2.68 g. having a softening point from about 130–140° C., however, the polymer had not melting at 200° C. The polymer is rubbery at 200° C.

EXAMPLE 6

This example describes the use of vanadium oxychloride ($VOCl_3$) in conjunction with the usual electrolyzed aluminum solution to polymerize ethylene. From the same stock solution used to prepare the electrolyte in Example 5 the electrolyte for this example was obtained. 100 ml. of this electrolysis stock solution was used. It was added to the electrolysis cell with nitrogen blanketing, then ethylene was bubbled through the electrolysis solution both before and during electrolysis. The time of electrolysis was 64 minutes and a constant current of about 50 milliamps was maintained during the electrolysis. During the electrolysis, 2 additional 10 ml. portions of dry methylene dichloride were added to the electrolysis cell.

Loss of aluminum from the anode during electrolysis was 0.0459 g. and 2.0 mfaradays of electricity was passed during electrolysis.

To the electrolyzed solution was added 0.17 mmole (0.0295 g. equals 0.0161 ml.) of $VOCl_3$, giving a molar ratio of 1:1 of Al to V. Ethylene flow was then started and continued for 30 minutes at which time the polymerization mixture was almost too thick because of the polymer formed to continue the polymerization. The polymerization mixture was then quenched and the polymer worked up in the usual manner. The yield of the polymer was 2.93 g. and the polymer had a softening point between 130 and 140° C. but did not melt even at 200° C. at which temperature it is a rubber. The polymer is soluble in hot xylene.

EXAMPLE 7

This example describes the polymerization of butadiene using a catalyst formed by mixing titanium tetraiodide ($TiI_4$) with an electrolyzed aluminum component. The electrolysis solution was prepared by adding 0.15 g. of aluminum chloride (0.00113 mole) and 0.020 g. of water (0.00113 mole) to 200 ml. of purified and dried methylene dichloride resulting in an aluminum/water molar ratio of 1 Al:1 $H_2O$. 100 ml. of this solution was charged to the electrolysis vessel with nitrogen blanketing. During this first six minutes of electrolysis the cell was blanketed with nitrogen but at the end of this time, ethylene was used to blanket the cell for the balance of the electrolysis. Total electrolysis time was 75 minutes and constant current of about 0.05 amp were maintained during the electrolysis. At the end of the electrolysis the cell was again blanketed with nitrogen and the ethylene blanketing stopped.

To the electrolyzed mixture was added 0.6 g. (2 mmoles) of titanium tetraiodide. Butadiene was then added to the electrolysis cell for one hour. At the end of the hour of polymerization the polymerization mixture was quenched and the polymer worked up in the usual manner. Yield of dry polymer was 4.74 g.

EXAMPLE 8

This example teaches the use of the mother liquor from a prior polymerization with a fresh electrolysis solution to polymerize ethylene. The first experiment to prepare the mother liquor for use in the polymerization of this experiment was as follows: A stock solution of the electrolyte was made up as follows: 0.34 g. (2.54 mmoles) of aluminum chloride and 0.052 ml. (1.27 mmoles) of methanol was added to 450 ml. of methylene dichloride. An aliquot of 100 ml. of this stock solution was added to the electrolysis cell. The electrolysis was carried out using ethylene blanketing of the electrolysis cell for 33 minutes and a constant current of about 50 milliamps was maintained during this time. 1.0 mfaradays of electricity was used in the electrolysis. The anode lost 0.86 mmole of aluminum.

0.43 mmole (0.11 g.) of dicyclopentadienyl titanium dichloride was added to the electrolyzed solution to give an aluminum to titanium ratio of 2 Al:1 Ti. Polymerization of the ethylene was carried on for one hour and then the polymer was separated by filtration from the mother liquor.

Below is described the experiment in which the mother liquor was used. To the electrolysis vessel was charged 100 ml. of the same stock solution of electrolyte as is described in the paragraph above of this example. The electrolysis cell was blanketed with ethylene and electrolysis was conducted for 45 minutes. 1.02 mfaradays of electricity was used and the anode loss was 1.06 millimoles of aluminum. The electrolyzed solution was added to the mother liquor from the polymerization described in the previous paragraph and ethylene was passed through this catalyst solution for one hour. The polymer recovered was 1.42 g. of polymer having a melting point of 129–133° C.

EXAMPLE 9

Preparation of the pre-electrolysis solution: To a 500 ml. flask is charged 400 ml. of anhydrous dichloromethane and 0.268 g. of anhydrous aluminum chloride under nitrogen. Maintaining a nitrogen atmosphere the mixture is stirred with a magnetic stirrer and 36 milligrams of water is added to the vortex of the stirred liquid. The mixture is stirred over night giving a clear, homogeneous yellow solution.

Electrolysis: A glass electrolysis cell was set up, equipped with a subsurface gas inlet tube, a magnetic stirring bar and a condenser. The electrodes were three weighed concentric hollow aluminum cylinders with 0.25 inch separation, the anode being the middle electrode.

The electrolysis cell was flushed with nitrogen and the pre-electrolysis solution added. The pre-electrolysis solution was saturated with dry ethylene and the current turned on. The current, 0.5 amp, was supplied from a constant current DC power supply and the voltage required to maintain this current level was between 110 and 145 volts. During the electrolysis ethylene was passed through the cell by means of the gas inlet tube. The temperature during electrolysis was 40° C. After 40 minutes the electrolysis was stopped and the electrolyzed solution transferred to a reservoir on the polymerization reactor. During the 40 minute electrolysis 12.44 millifaradays of current were passed. The electrodes were removed from the cell, dried and weighed. 0.3389 g. of the aluminum anode had been consumed. The loss of aluminum was equal to 12.55 mg. atoms and represents 1.01 g. atoms of aluminum lost from the anode per faraday. Aliquots of the clear red solution of bis-(dichloroaluminum)methane [$Cl_2AlCH_2AlCl_2$] were used for polymerizations.

EXAMPLE 10

Preparation of the pre-electrolysis solution: To a 500 ml. flask is charged 400 ml. of anhydrous dichloromethane and 0.250 g. of ethyl aluminum dichloride under nitrogen. Maintaining a nitrogen atmosphere the mixture is stirred with a magnetic stirrer and 36 milligrams of water is added to the vortex of the stirred liquid. The mixture is stirred over night giving a clear, homogeneous yellow solution.

Electrolysis: A glass electrolysis cell was set up and equipped with a subsurface gas inlet tube, a magnetic stirring bar and a condenser. The electrodes were three weighed concentric hollow aluminum cylinders with 0.25 inch separation, the anode being the middle electrode.

The electrolysis cell was flushed with nitrogen and the above pre-electrolysis solution added. The pre-electrolysis solution was saturated with dry ethylene and the current turned on. The current, 0.5 amp, was supplied from a constant current DC power supply and the voltage required to maintain this current level was between 60 and 80 volts. During the electrolysis ethylene was passed through the cell by means of the gas inlet but. The temperature during electrolysis was 40° C. After 40 minutes the electrolysis was stopped and the electrolyzed solution transferred to a reservoir on the polymerization reactor. During the 40 minute electrolysis 12.44 millifaradays of current were passed. The electrodes were removed from the cell, dried and weighed. 0.3196 g. of the aluminum anode had been consumed. The loss of aluminum was equal to 11.84 millig. atoms and represents 0.95 g. atom of aluminum lost from the anode per faraday. Aliquots of the clear red solution of bis-(dichloroaluminum)methane

[$Cl_2AlCH_2AlCl_2$]

were used for polymerizations.

EXAMPLE 11

This example represents a general method for complexing the cocatalysts for the polymerization of monomers.

A 300 ml. glass vessel equipped with a magnetic stirrer and suitable ports for filling, emptying and introduction of inert atmospheres is placed in the lines after the solvent and electrolysis reservoirs and ahead of the reactor. This vessel is referred to as the catalyst complexer.

The catalyst complexer was charged with 110 ml. of the electrolyzed solution, containing 2 millimoles of $Cl_2AlCH_2AlCl_2$ as prepared in Examples 9 or 10, and 1.9 ml. of a 1.05 N solution of n-butoxytitanium trichloride in dichloromethane was added with a hypodermic syringe. The mixture was stirred for 30 minutes. The complexed catalyst thus prepared is used for polymerizations.

EXAMPLE 12

A two liter stainless steel stirred reactor equipped with suitable inlet ports, bottom drain, thermocouple, jacket for heating or cooling and a pressure gauge was charged with 500 ml. of dry hexane. The complexed cocatalyst as described in Example 11 was then charged to the reactor with stirring followed by an additional 500 ml. of hexane. The reactor was sealed and pressured to 120 p.s.i.g. with dry ethylene, and this pressure was maintained during the entire run. The polymerization was exothermic and after 10 minutes the reactor was cooled with air. The reaction temperature was maintained at 60° C. ±2 by control of the amount of cooling air. After 1 hour the reaction mixture was cooled to room temperature with water, the reactor vented, flushed with nitrogen and the reactor emptied. The polymerization mixture was quenched with an equal volume of methanol and filtered under vacuum. The polyethylene was washed on the filter with additional methanol, slurried in boiling methanol and refiltered. The polyethylene was vacuum dried on the filter using a rubber dam and the semi-dried polymer treated with an antioxidant Ionol (2,6-di-tert-butyl - 4 - methylphenol). The polymer was then vacuum dried at 60° C. for 18 hours. The yield was 138.3 g. of solid polyethylene.

EXAMPLE 13

0.125 g. (0.5 millimole) of dicyclopentadienyltitanium dichloride—recrystallized—was dissolved in about one liter of dichloromethane. The dicyclopentadienyl titanium dichloride solution was transferred to a reservoir above the polymerization vessel under nitrogen pressure. Then 930 ml. of the titanium compound solution was charged to the reactor and the stirrer in the reactor was turned on. Between 55 and 60 ml. of the electrolysis solution containing about 0.5 millimole of $Cl_2AlCH_2AlCl_2$ was charged to the reactor followed by the remaining 100 ml. of the titanium compound solution. The reactor was sealed and pressured to 82 p.s.i.g. with ethylene. After 25 minutes the pressure was increased to 93 to 95 p.s.i.g. The polymerization was terminated after one hour, and the reactor was cooled and vented. After flushing the reactor with nitrogen the bottom drain of the reactor was opened and only a trace of polymer was obtained through the drain. The reactor was pressured with 25 p.s.i.g. of nitrogen and allowed to stand over night. The reactor was vented and opened. The walls of the reactor and all the parts were coated with polyethylene. The polymer was removed from the reactor and quenched with methanol. The polyethylene was separated by filtration from the methanol and washed in a Waring blender with methanol. The polymer was again separated by filtration and slurried in boiling methanol. The polymer was then filtered, washed on the filter with methanol and sucked dry with vacuum. The polymer was treated on the filter with 10 ml. of Ionol in methanol (one mg. of Ionol/ml. methanol). The polymer was dried in the vacuum oven over night at 60° C. Yield of solid polymer was 57.5 g.

EXAMPLE 14

In this example, the polymerization was carried out under pressure and $TiCl_4$ was the heavy metal compound mixed with the electrolyzed aluminum compound to form the catalyst. 1 ml. of $TiCl_4/Ch_2Cl_2$ solution (0.966 N) was added to about 1 liter of dichloromethane. The clear $TiCl_4/CH_2Cl_2$ solution was charged to a reservoir for use in charging the polymerization vessel. To the polymerization vessel was added 900 ml. of the titanium tetrachloride solution followed by 50 ml. of an electrolysis solution containing about 1 millimole of $Cl_2AlCH_2AlCl_2$, and the mixture was stirred. Then the remaining 200 ml. of titanium tetrachloride solution was charged to the reactor and the reactor was sealed. The reactor was then pressurized to 96 p.s.i.g. with ethylene. At about 2 hours and 10 minutes, the pressure was increased to 106 p.s.i.g. At about 3 hours, after the beginning of the polymerization, cooling became necessary. At the end of 4 hours, the polymerization was terminated due to the fact that the ethylene inlet tube became clogged. The reactor was cooled and vented and when it was opened it was found to be full of polymer. The contents of the reactor were quenched with methanol, the polymer separated by filtration, slurried in boiling methanol and filtered again. The polymer was then washed on the filter with methanol. The polymer was filtered again to remove the methanol. The polymer was then treated with 50 ml. of Ionol solution. The polymer was then dried overnight in a vacuum at 60° C. Yield of solid polymer was 203.3 g.

EXAMPLE 15

This experiment shows the use of n-butoxytitanium trichloride as the heavy metal compound in a polymerization. 1.25 ml. of n-butoxytitanium trichloride/methylene dichloride solution (1 millimole of n-butoxytitanium trichloride) was added to 1 liter of dichloromethane.

75 ml. of electrolysis solution was prepared in a similar manner to Example 9 or 10. This electrolysis solution had 1.23 millimoles of bis(dichloroaluminum) methane in it. The reactor was flushed with 45 ml. of electrolyzed solution in 500 ml. of dichloromethane and dumped. Then, the 1.25 ml. of n-butoxytitanium trichloride/methylene dichloride solution as described above was charged to methylene dichloride in a reservoir above the reactor. The total volume was 1 liter with the added methylene dichloride. To the reaction vessel was then charged 800 ml. of the n-butoxytitanium trichloride/methylene dichloride solution, then the 75 ml. of electrolysis solution was added and finally the remaining 200 ml. of n-butoxytitanium trichloride/methylene dichloride solution was added to the reactor. The reactor was sealed and pressured to 112 p.s.i.g. with ethylene. The ethylene was fed over the surface of the reaction mixture and the stirrer speed in the reactor was 1600 r.p.m. Polymerization was continued for 2 hours with no heating or cooling. The reactor was then cooled to room temperature by water cooling, vented, flushed with nitrogen and the contents of the reactor were dumped through the bottom drain. The reactor was flushed 2 times with 500 ml. of dry methylene dichloride by filling, stirring and dumping. The reaction mixture was quenched with an equal volume of methanol and the polyethylene was removed by filtration under vacuum. The polyethylene was washed on the filter with methanol, slurried in boiling methanol and separated again by vacuum filtration. The polyethylene was washed on the filter with additional methanol and sucked dry with vacuum. The polyethylene was then treated with 50 ml. of Ionol solution and was blended with the polyethylene on the filter with a spatula. The polyethylene was then dried overnight in a vacuum oven at 60° C. Yield of dried polymer was 166.9 grams. This represents 166.9 grams of polyethylene/millimoles of n-butoxytitanium trichloride. The polymer had a melting point of 130–134° C.

EXAMPLE 16

This example describes a polymerization wherein the heavy metal compound was ethoxytitanium trichloride and the concentration in the polymerization vessel was 1 millimole per liter of solvent. 500 ml. of hexane was charged to the polymerization reactor. To the complexer was added 55 ml. of electrolysis solution containing 1 millimole of bis-(dichloroaluminum)methane and 0.85 ml. of ethoxytitanium trichloride dissolved in methylene dichloride (1.1195 N, 1 millimole). The mixture in the complexer turned black and then muddy brown. The mixture in the complexer was stirred for 30 minutes. Then the contents of the complexer was charged to the polymerization reactor along with 500 ml. hexane. The reactor was pressured with ethylene to 120 p.s.i.g. After 30 minutes of polymerization, the reaction vessel was heated for 15 minutes to 50° C. Polymerization was continued for one hour after which time the reactor was cooled and vented, the reaction mixtures dumped from the reactor, methanol added to the reaction mixture to quench it, and the polymer was worked up in the usual manner. Weight of dry solid polymer was 38.4 g.

EXAMPLE 17

This experiment shows that water modified $TiCl_4$ is an effective catalyst when combined with bis-(dichloroaluminum)methane. One liter of dichloromethane which was carefully dried was added to 180 microliters (10 millimoles) of water. To this water, methylene dichloride solution was added 14.4 ml. (10 millimoles) of titanium tetrachloride dissolved in hexane (0.696 N $TiCl_4$). This mixture was refluxed under nitrogen for 2 hours to drive off HCl and cooled under nitrogen. A white opaque mixture which did not settle out on standing resulted. This mixture was transferred to a reservoir over the polymerization reactor.

85 ml. of this water modified $TiCl_4$, approximately 1 millimole, was charged to the catalyst complexer and 70 ml. [1 millimole of bis(dichloroaluminum)methane] of electrolysis solution was added to the titanium compound. The mixture in the complexer was stirred for 15 minutes. This complexed catalyst was charged to the polymerization reactor with one (1) liter of dry methylene dichloride. The reactor was sealed and pressured to 111 p.s.i.g. with ethylene which had been carefully dried. After about 15 minutes, the reactor was gradually heated with steam and after about 1 hour and 50 minutes the reactor temperature leveled out at 73.5° C. This temperature was maintained by heating with steam. After three hours run time the reactor was cooled, vented and opened. The reactor was dumped and cleaned out. The reaction mixture was quenched with an equal volume of methanol, filtered and washed on the filter with additional methanol. The solid polyethylene product was dried in a vacuum oven at 60° C. over the week-end. The resulting dried polyethylene product was 53.2 g. which represents 53.2 g. of polymer/millimole of titanium.

EXAMPLE 18

This experiment shows the use of 0.5 millimole of n-butoxytitanium trichloride per liter of solution in polymerization. Chemicals: 0.7 ml. of approximately 0.5 millimoles of n-butoxytitanium trichloride, 30 ml. [0.5 millimole of bis(dichloroaluminum)methane] electrolysis solution, 1 liter of dichloromethane which had been carefully dried as were the other materials and carefully dried ethylene. The n-butoxytitanium trichloride/methylene dichloride was charged to 500 ml. of methylene dichloride in a reservoir and an additional 500 ml. of methylene dichloride was added. 800 ml. of this titanium compound solution was charged to the reactor followed by the electrolysis solution and finally the remaining 200 ml. of the titanium compound solution. The reactor was sealed and pressured to 72 p.s.i.g. with ethylene. Polymerization temperature was 62° C. and polymerization time was 2 hours. The reactor was dumped through the bottom drain and the reaction mixture quenched with an equal volume of methanol. The solid polyethylene product was filtered off under vacuum and washed on the filter with methanol. The polyethylene was slurried with boiling methanol, filtered, washed on the filter with methanol and sucked dry under vacuum. The polyethylene was then dried in a vacuum oven over night at 60° C. Yield of solid polymer was 10.6 g.

EXAMPLE 19

This is another run at an n-butoxytitanium trichloride level of 1 millimole per liter of solvent. The polymerization reactor was charged 500 ml. of hexane. To the complexer was added 52 ml. of bis-(dichloroaluminum)methane solution (1 millimole) and 0.95 ml. of n-butoxytitanium trichloride solution (1 millimole). The mixture was complexed for 5 minutes and the brownish-black solution mixture resulted. The catalyst was added to the reactor and then an additional 500 ml. of hexane was added to the reactor. The reactor was pressured to 116 p.s.i.g. with ethylene. The temperature was allowed to rise of its own accord, and reached 57° C. in one hour. The reactor was then cooled, vented and to the reactor was added 500 ml. of hexane before dumping the contents of the reactor. The reactor was washed with two 500 ml. portions of hexane. The polymer was quenched with methanol, filtered, washed and boiled for about ½ hour with methanol. The polymer was then filtered from the methanol and a vacuum pulled on the polymer on the filter. Then to the polymer there was added 25 ml. of Ionol solution, and this was mixed in with the polymer. The polymer was dried over night in a vacuum oven at 65° C. Solid polymer yield was 93.7 g.

EXAMPLE 20

This experiment represents a 2 millimole concentration of n-butoxytitanium trichloride in hexane polymerization run. To the reactor was added 500 ml. of hexane. To the complexer was added 110 ml. of bis-(dichloroaluminum)methane solution (2 millimoles) and 1.9 ml. of n-butoxytitanium trichloride solution (2 millimoles). The complexer was run for 5 minutes and then the complexed catalyst was added to the reactor along with an additional 500 ml. of hexane. The reactor was pressured to 116 p.s.i.g. with ethylene. The reaction was very fast and temperature control was essentially lost after 5 minutes. After one hour the reactor was vented and 1 liter of hexane was added to the reactor. On dumping the reactor approximately 1 liter of hexane was recovered. The reactor was opened and was found to be full of polymer. The polymer was scraped out of the reactor and washed and boiled with methanol. The methanol was filtered from the polymer and 50 ml. of Ionol solution was added to the filter cake. The polymer was dried in a vacuum oven over night at 65° C. and the yield of solid polyethylene was 198.5 grams.

EXAMPLE 21

This is another run using equal molar amounts of bis-(dichloro-aluminum)methane and n-butoxytitanium trichloride at a 1 millimole level of each in the polymerization medium. To the reactor was charged 500 ml. of hexane. To the complexer was added approximately 50 ml. of bis-(dichloro-aluminum)methane solution (1 millimole) dissolved in methylene dichloride and 0.95 ml. of n-butoxytitanium trichloride solution (1 millimole) dissolved in methylene dichloride. The complexer was run for 30 minutes to mix the catalyst and a chocolate brown solution resulted. The catalyst was added to the reactor and an additional 500 ml. of hexane was added to the polymerization reactor. The reactor was closed and pressured to 116 p.s.i.g. with ethylene. The temperature in the reactor rose steadily throughout the one hour polymerization run. At the end of the hour, the reactor was cooled and vented. The reactor was then opened. The reaction mixture in the reactor was quenched with methanol and transferred to a beaker where it was left standing over night. The next day the polymer was worked up in the usual fashion including the addition of the normal amount of Ionol antioxidant to the polymer. Dried solid polymer weight 172.5 g.

EXAMPLE 22

In this example, the electrolyte was tetraethylammonium chloride rather than aluminum chloride. The pre-electrolysis solution consisted of 400 ml. of dichloromethane and 0.12 g. of $(C_2H_5)_4$ NCl. During the electrolysis 6.895 milligram atoms of aluminum was lost from the anode. This represents 0.60 gram atoms of aluminum lost per faraday used. Electrolysis time was 37 minutes and during this time a constant current of about 0.5 amp was maintained. Ethylene blanketing was used during the electrolysis. During the electrolysis 11.51 millifaradays of electricity were used.

To the polymerization reactor was added 500 ml. of hexane. To the complexer was charged 130 ml. of the electrolyzed solution having 2 millimoles of bis(dichloroaluminum)methane therein and 1.9 ml. (2 millimoles) of n-butoxytitanium trichloride solution. The mixture of catalyst components was stirred for five minutes in a complexer and then charged to the reactor. An additional 500 ml. of hexane was charged to the reactor. The reactor was then pressured to 116 p.s.i.g. with ethylene. The temperature in the reactor rose slightly and then the reactor was heated with steam. After one hour the reactor was vented and dumped. The product was quenched with methanol and worked up in the usual manner. Yield of recovered solid polyethylene was 8.8 grams.

EXAMPLE 23

This example shows a polymerization run in which the ratio of titanium compound to aluminum compound was 2:1 molar. To the polymerization vessel was charged 500 ml. of hexane. To the complexer was added 100 ml. of electrolysis solution containing 1.54 millimoles of bis-(dichloro-aluminum)methane and 2 ml. of n-butoxytitaanium trichloride solution containing 3.08 millimoles of titanium compound. The complexer was run for 30 minutes to mix the catalyst components and then the catalyst was added to the reactor. After the addition of the catalyst to the reactor 500 ml. of hexane was added and the reactor was pressured to 118 p.s.ig. with ethylene. At the end of an hour the reactor was cooled to 35° C., vented and dumped. The reactor was washed out with two 500 ml. portions of hexane. The reaction mixture was then quenched with methanol and let stand. The quenched reaction mixture was worked up in the usual manner to purify and recover the solid polymer porduct. 90.0 g. of solid polyethylene were recovered.

EXAMPLE 24

This experiment shows a ratio of the titanium compound to aluminum compound of 1:2 molar. To the polymerization reactor was charged 500 ml. of hexane. To the complexer was added 130 ml. of bis-(dichloro-aluminum)methane solution having a 2 millimoles of the aluminum compound therein. Also added to the complexer was 0.95 ml. of n-butoxytitanium trichloride solution having 1 millimole of the titanium compound therein. The complexer was run for 30 minutes after which time the catalyst was added to the polymerization reactor along with another 500 ml. of hexane. The reactor was pressured to 117 p.s.i.g. with ethylene. The uptake of the ethylene appeared to be slow. At the end of one hour the reactor was vented and dumped and the polymer worked up in the usual fashion. Yield of solid polyethylene polymer was 10.1 g.

EXAMPLE 25

This example describes a normal electrolysis and a use of the mother liquor from the polymerization for another polymerization. In the electrolysis, ethylene blanketing was used and the anode loss was 2.97 millimoles of aluminum. To the electrolyzed solution was added 0.5 g. of dicyclopentadienyltitanium dichloride and ethylene was passed through the catalyst mixture for one hour. After the hour of polymerization, the polymer was separated by filtration in a closed fritted filter and the polymer was washed two times with 10 cc. portions of methylene dichloride. The mother liquor from the filtrations and the washings were fed to a tubular reactor under nitrogen blanketing and ethylene was bubbled through the stirred mixture for one hour. Methanol was added to the reaction mixture and the polymer was separated by filtration. The polymer products from both the first and second polymerizations were separately washed with methanol, then, slurried with hot methanol containing 5% concentrated hydrochloric acid. The polymers were then filtered from the methanol and HCl, were washed and dried in a vacuum oven at about 60° C. The weight of polymer from the first polymerization was 3.48 grams and it had a specific viscosity of 0.043 at 0.1% concentration in xylene at 105° C. The yield of polymer from the second polymerization was 1.69 g. and its specific viscosity was 0.074 at 0.1% concentration in xylene and at 105° C.

EXAMPLE 26

This example shows a polymerization using tetra-n-butoxytitanium as the heavy metal compound. To the complexer was charged 235 ml. of bis-(dichloroaluminum) methane having 4 millimoles of BDCAM therein and 0.35 ml. of tetra-n-butoxytitanium (1 millimole) and the mixture was stirred for 15 minutes. The titanium compound was purchased. The contents of the complexer were then charged to a polymerization reactor along with one liter of methylene dichloride. The reactor was pressured to 104 p.s.i.g. with ethylene, and after a short period the reactor was vented to 90 p.s.i.g. and heated to 75° C. The ethylene pressure was maintained at 90 p.s.i.g. during the balance of the run which was one hour of polymerization. At the end of the hour the reactor was cooled, vented and the polymer recovered and worked up in the usual manner. Yield of polymer was 11.5 g.

EXAMPLE 27

This example describes a polymerization in which the heavy metal compound was n-dodecyloxytitanium trichloride at a 2 millimole level in solvent. The titanium compound was prepared in dichloromethane solvent and used without isolation for the later polymerization. The titanium compound was prepared by charging methylene dichloride and titanium tetrachloride to a reaction vessel. Then to the reaction vessel n-dodecyl alcohol was added drop-wise until an equal molar amount had been added based on the titanium tetrachloride. The reaction mixture was then refluxed for 8 hours at which time no further hydrogen chloride was being evolved. The product solution of n-dodecyloxytitanium trichloride in methylene dichloride contained 1 millimole of the titanium compound per 1.1 ml. of solution.

To the polymerization reactor was charged 500 ml. of methylene dichloride. To the complexer was charged 60 ml. of bis-(dichloroaluminum) methane (2 millimoles) and 2.2 ml. of the n-dodecyloxytitanium trichloride (2 millimoles) and the mixture in the complexer was stirred for 5 minutes. Along with an additional 500 ml. of methylene dichloride, the contents of the complexer were charged to the polymerization vessel and the polymerization vessel was pressured with ethylene to 102 p.s.i.g. The reaction was exothermic and the temperature rose quickly to 75° C. and was maintained between 75 and 80° C. with air cooling of the reactor. After 15 minutes of polymerization the ethylene feed was turned off and the reactor was cooled, vented, 500 ml. of methylene dichloride was added and the contents of the reactor dumped. The reactor was washed once with 500 ml. of methylene dichloride. Most of the mother liquor was siphoned from the polymer. Then the polymer was washed twice with methanol and boiled for 30 minutes with methanol. The polymer was recovered by filtration, was washed and after the removal of the methanol, 40 ml. of Ionol solution was added and blended into polymer. The polymer was dried in a vacuum oven. Yield of dried polymer was 134 g.

EXAMPLE 28

This example illustrates the making of a copolymer of ethylene/1-butene (97/3 molar ratio) using a catalyst of the invention. To the polymerization reaction was charged 500 ml. of methylene dichloride and to the complexer was added 20 ml. of methylene dichloride, 30 ml. of bis(dichloroaluminum)methane (1 millimole) and 1.1 ml. of n-dodecyloxytitanium trichloride solution (1 millimole). The complexer contents were stirred for 5 minutes and then the contents of the complexer were added to the reactor along with 480 ml. of methylene dichloride. The reactor was pressured to 86 p.s.i.g. using an ethylene/1-butene comonomer mixture. The reaction was exothermic and the temperature steadily rose to about 66° C. At the end of one hour of polymerization the reactor was cooled, vented and the contents of the reactor dumped. The reactor was then opened and it was found that polymer was caked on the walls. The polymer was removed from the reactor and worked up in the normal manner. Yield of polymer was 39.1 g.

EXAMPLE 29

This example illustrates the use of di-n-butoxytitanium dichloride in a polymerization. The titanium compound made by adding 164.4 g. of dichloromethane and 22.2 g. (0.117 mole) of titanium tetrachloride was charged to a reactor and over a 15 minute period, 38.8 g. (0.114 mole) of tetra-n-butyltitanate was added drop-wise to the titannium tetrachloride in dichloromethane at ice water temperature. This mixture was stirred at room temperature for four days. The final weight of solution was 223.0 grams having a density of 1.28 g./ml. This solution then is 1.328 normal or has 1 millimole of di-n-butoxytitanium dichloride per 0.755 ml. of solution.

To the polymerization reactor was added 500 ml. of methylene dichloride and to the complexer was added 52 ml. of bis(dichloroaluminum)methane (1 millimole) and 0.75 ml. of di-n-butoxytitanium dichloride (1 millimole). The mixture in the complexer was stirred for 5 minutes and then added to the reactor along with an additional 500 ml. of methylene dichloride. The reactor was pressured to 106 p.s.i.g. with ethylene and the temperature rose gradually to 67° C. After one hour of polymerization the reactor was cooled, vented and the contents dumped. The reactor was washed out with 1 liter of methylene dichloride and the washings were combined with the crude product. The product was worked up in the usual manner and 62.9 g. of fibrous polymer was recovered.

EXAMPLE 30

This example describes the use of n-dodecylthiotitanium trichloride for polymerization at the 2 millimole level in solvent. The n-dodecylthiotitanium trichloride was prepared in a similar manner to the n-dodecyloxytitanium trichloride using a slight excess over an equal molar amount of 1-dodecanethiol to titanium tetrachloride. The reaction mixture was refluxed over night and still some hydrogen chloride was being given off. Also the flask contained some solids and additional methylene dichloride was added. The solution was still not complete. Density of the solution was 1.315 g./ml. The solution calculated to be 0.456 normal having 1 millimole of n-dodecylthiotitanium trichloride per 2.19 ml. of solution.

To the polymerization reactor was added 500 ml. of methylene dichloride and to the complexer 105 ml. of bis (dichloroaluminum) methane (2 millimoles) and 4.4 ml. of n-dodecylthiotitanium trichloride (2 millimoles). The mixture in the complexer was stirred for 5 minutes and was then charged to the reactor along with an additional 500 ml. of methylene dichloride. The reactor was pressured to 102 p.s.i.g. with ethylene and the temperature in the reactor gradually rose to 73° C. during the polymerization. Polymerization time was one hour after which time the reactor was cooled and 500 ml. of methylene dichloride was added and mixed with the reactor content before discharging the reactor. The polymer product was worked up and recovered in the usual manner. Yield of polymer product was 135.5 g.

EXAMPLE 31

This example illustrates the use of n-hexadecyloxytitanium trichloride as a catalyst in polymerization at a 1 millimole level in solvent. The titanium component was made in an analogous method to the making of the n-dodecyloxytitanium trichloride except that the mixture of titanium tetrachloride and hexadecyl alcohol was stirred for 4 days and then refluxed for 18 hours. At the end of this time hydrogen chloride evolution had ceased. The weight of the contents of the flask was 168.3 g. and the density of this solution was 1.25 g./ml. The solution was 0.845 normal and 1 millimole of n-hexadecycloxytitanium trichloride was contained in 1.18 ml. of solution.

To the reactor was charged 500 ml. of dichloromethane and to the complexer 55 ml. (1 millimole) of bis(dichloroaluminum)methane and 1.2 ml. (1 millimole) of n-hexadecyloxytitanium trichloride. The complexer contents were stirred for 5 minutes and then charged to the reactor followed by the addition of 500 ml. of dichloromethane. The reactor was pressured to 102 p.s.i.g. with ethylene. The temperature in the reactor rose steadily to 56° C. and after one hour of polymerization the reactor was cooled, vented and dumped. Then the reactor was rinsed with 500 ml. of dichloromethane. The product was worked up and recovered in the usual manner and 99.0 g. of product was the yield.

EXAMPLE 32

This example shows a polymerization using tri-n-butoxytitanium chloride as a catalyst component at a 2 millimole level in solvent. 65.2 g. of dichloromethane was added to a 100 ml. flask under nitrogen blanketing and the tri-n-butoxytitanium chloride was made by adding tetra-n-butoxytitanium to titanium tetrachloride at ice-bath temperature and refluxing to insure complete reaction. The desired product tri-n-butoxytitanium chloride was then recovered and purified after removing the solvent by distillation of the reaction mixture. For polymerization a solution was made by dissolving 7.2 g. (0.0238 mole) of tri-n-butoxytitanium chloride in 65.2 g. of dichloromethane. The solution was 0.437 normal and 1 millimole of tri-n-butoxytitanium chloride is contained in 2.29 ml. of solution.

To the reactor was added 500 ml. of dichloromethane and to the complexer 105 ml. of bis(dichloroaluminum) methane (2 millimoles) and 4.6 ml. (2 millimoles) of tri-n-butoxytitanium chloride. The complexer was stirred for 5 minutes and then the contents of the complexer were charged to the reactor followed by an additional 500 ml. of dichloromethane. The reactor was pressured to 104 p.s.i.g. with ethylene. The temperature rise was slow but increased after 30 minutes. At the end of 90 minutes the reactor was cooled, vented and dumped. The polymer was worked up and recovered in the usual manner. Yield of polymer was 27.5 g.

EXAMPLE 33

This example describes the use of n-hexadecyl amine titanium tetrachloride addition complex as a catalyst component in polymerization at the 2 millimole level in solvent. The titanium specie was made by adding an equal molar amount of hexadecylamine to titanium tetrachloride in dichloromethane and after mixing to dissolve all components the mixture was refluxed for 24 hours. The product solution was 0.749 normal and 1 millimole of n-hexadecylamine titanium tetrachloride was contained in 1.33 ml. of solution.

To the reactor was charged 500 ml. of dichloromethane and to the complexer 110 ml. (2 millimole) of bis(dichloroaluminum)methane and 2.7 ml. (2 millimole) of n-hexadecylaminotitanium trichloride. The mixture in the complexer was stirred for 5 minutes and then charged to the polymerization reactor. An additional 500 ml. of dichloromethane was added to the reactor and the polymerization was carried out for one hour. At the end of the one hour of polymerization the reactor was cooled, vented and dumped. The ethylene polymer was worked up and recovered in the usual manner and the yield of polymer was 86.0 g.

EXAMPLE 34

This example describes the use of

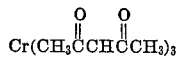

chromium acetylacetonate as a catalyst component in polymerization. To the reactor was charged 500 ml. of methylene dichloride and to the complexer was charged 75 ml. of bis(dichloroaluminum)methane (BDCAM) (0.6 millimoles) dissolved in methylene dichloride and made in the usual manner and 1.6 ml.

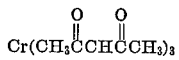

(0.06 millimoles) in methylene dichloride. The mixture in the complexer was stirred 5 minutes and then added to the reactor. An additional 500 ml. of methylene dichloride was added to the reactor and the reactor was pressured to 75 p.s.i.g. with ethylene. Polymerization was carried on for 30 minutes after which time the reactor was vented and dumped. The reactor was then washed with 500 ml. of methylene dichloride and the washings were added to the polymer. The mixture of the polymer with the washings was quenched with methanol and 5.2 g. of dried solid polyethylene product was recovered.

EXAMPLE 35

This example describes the use of

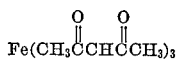

ferric acetylacetonate as a polymerization catalyst component. 500 ml. of methylene dichloride was charged to the reactor and to the complexer was charged 125 ml. of bis(dichloroaluminum)methane (1.0 millimoles) and methylene dichloride and 1.9 ml.

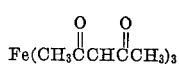

(0.1 millimoles) in methylene dichloride. The mixture in the complexer was stirred for 5 minutes and then added to the reactor. An additional 500 ml. of methylene dichloride was added to the reactor and the reactor was pressured to 75 p.s.i.g. with ethylene. Polymerization was carried on for 30 minutes after which time the reactor was vented and dumped. The polymer was very finely dispersed in the reaction medium. The reactor was washed with 500 ml. of methylene dichloride and the wash was added to the polymer suspension. The mixture was quenched with methanol and 8.0 g. of solid dried polyethylene was recovered.

EXAMPLE 36

This example describes the use of the

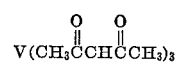

vanadium acetylacetonate as a catalyst component in polymerization. To the reactor was charged 500 ml. of methylene dichloride and to the complexer 70 ml. of bis-(dichloroaluminum)methane (1.0 millimole) in methylene dichloride and 1 ml. of vanadium acetylacetonate (0.056 millimole) in methylene dichloride. The mixture in the complexer was stirred 5 minutes and then added to the reactor along with an additional 500 ml. of methylene dichloride. The reactor was pressured to 75 p.s.i.g. with ethylene for 5 minutes after which time the ethylene was shut off and the reactor cooled. The reactor was opened to remove polymer. The polymer was worked up and dried in the usual fashion. Weight of polymer was 75.2 g.

EXAMPLE 37

This example describes the use of manganese acetylacetonate

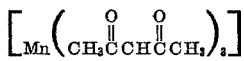

as a catalyst component in polymerization. Manganese acetylacetonate was not as soluble as were some of the other metal acetylacetonates and a partial solution slurry of manganese acetylacetonate was prepared by adding 2.550 g. of manganese acetylacetonate to 1.33 ml. of dichloromethane and stirring overnight. The polymerization was conducted in a similar fashion to Example 37. To the complexer was charged 1.3 ml. of manganese acetylacetonate (0.1 millimoles) in methylene dichloride and 111 ml. of bis(dichloroaluminoum)methane (1 millimole) in methylene dichloride. The usual amount of methylene dichloride was added to the reactor as in the previous experiment. Time of the catalyst components in the complexer was 5 minutes and a homogeneous solution resulted. The reactor was pressured to 75 p.s.i.g. with ethylene and the polymerization run for 10 minutes. Temperature rose from 23–76° C. The recovered polymer was worked up in the usual manner and the yield was 54.8 g. of solid polyethylene, 548 g. per millimole of manganese acetylacetonate.

EXAMPLE 38

This example describes the use of nickel acetylacetonate

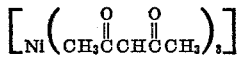

in conjunction with $VOCL_3$ as catalyst components in polymerization. This experiment was run in a similar manner to Example 36 with like amounts of solvent being used. The charge to the complexer was 30 ml. of bis(dichloroaluminum)methane (0.2 millimoles), 1 ml. of $VOCL_3$ ($5 \times 10^{-6}$ mole) in methylene dichloride and 1 ml. of nickel acetylacetonate ($5 \times 10^{-6}$ mole) in methylene dichloride. Complexing time was 5 minutes, polymerization pressure 75 p.s.i.g. and run time 30 minutes. Temperature increased from 24–40° C. and water cooling was used on the reactor for the first 2½ minutes. Recovered polymer was 24.1 g. of solid polyethylene.

EXAMPLE 39

This example describes the use of manganese acetylacetoneate in the presence of hydrogen as a catalyst component in polymerization. The usual amounts of methylene dichloride solvent were used in the reactor. The charge to the complexer was 0.65 ml. manganese acetylacetonate (0.05 millimole) in methylene dichloride and 65 ml. bis-(dichloroaluminum)methane (0.5 millimole) in methylene dichloride. Complexer time was 5 minutes and polymerization run time 1 hour, during which the temperature rose from 24.5–33° C. After the catalyst was charged to the complexer, the reactor was flushed 5 times with high purity hydrogen and then pressured to 15 p.s.i.g. with hydrogen, and then the reactor was pressured to 73 p.s.i.g. with ethylene. Polymer was worked up in the usual fashion and the yield was 12.6 g. of solid polyethylene, 252 g. of polymer/millimole of manganese acetylacetonate.

EXAMPLE 40

This example describes the use of cobalt acetylacetonate

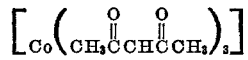

as a catalyst component in polymerization. Polymerization is run in the usual fashion with the usual 1 liter of dichloromethane added in 2 portions to the reactor. To the complexer was charged .1 ml. of cobalt acetylacetonate (0.1 millimole) in methylene dichloride and 130 ml. of bis(dichloraluminum)methane (1 millimole) in methylene dichloride. Complexing time was 5 minutes, 75 p.s.i.g. was polymerization pressure, 1 hour polymerization time and the temperature in the polymerization reactor rose from 23.5–29.5° C. Recovered dried polymer was 6.2 g. of solid polyethylene, 62 g. polymer/millimole cobalt acetylacetonate.

EXAMPLE 41

The series of runs described in this example show that the melt index of polyethylene using a bis(dichloroaluminum)methane/$VOCL_3$ catalyst can be controlled by hydrogen. All runs were made at 80 p.s.i.g. with the polymerization being started at room temperature and controlled at 77° C. with heat being supplied from an oil bath or cooling from water. Ethylene and hydrogen were premixed in a surge tank to give the ratio of hydrogen and ethylene shown in the following table. The reactor was then pressured to 80 p.s.i.g. with this hydrogen/ethylene mixture without stirring. The stirrer was then turned on in the reactor and pure ethylene feed was introduced into the reactor at 80 p.s.i.g. Polymerizations were continued until no more ethylene was absorbed. Solvent charged to the reactor was 1.5 liters. The bis(dichloroaluminum)methane used in the runs summarized below was made electrolytically in the usual fashion. The runs are summarized in the following table:

TABLE I

| | Millimoles | | | Mole percent $H_2$ | Gram polymer | G. polymer/ mM.[2] $VOCl_3$ | G. polymer/ g. $VOCl_3$ | $I_2$[5] | $I_{10}$[6] | $I_{10}/I_2$ |
|---|---|---|---|---|---|---|---|---|---|---|
| | BDCAM[1] | $VOCl_3$ | Solvent | | | | | | | |
| Run number: | | | | | | | | | | |
| a | 1.0 | 0.01 | $CH_2Cl_2$ | ~11 | [4] 45.1 | 4,510 | 26,100 | 0.021 | 0.48 | 22.8 |
| b | 1.0 | 0.01 | Hexane | 17 | 37.5 | 3,750 | 21,600 | 0.068 | 1.05 | 15.5 |
| c | 1.0 | 0.01 | do | 17 | 39.4 | 3,940 | 22,750 | 0.178 | 2.75 | 15.5 |
| d ([3]) | 1.0 | 0.01 | do | 17 | 69.6 | 6,960 | 40,000 | 3.8 | 38.8 | 10.2 |

[1] BCDCAM=bis(dichloroaluminum)methane.
[2] mM.=millimole.
[3] Reactor cleaned prior to this run.
[4] Polymer product had 2.9 p.p.m. vanadium, 5 p.p.m. chlorine and 46 p.p.m. aluminum.
[5] $I_2$=melt index of polymer product using 2 kilogram weight.
[6] $I_{10}$=melt index of polymer product using 10 kilogram weight.

If the hydrogen treatment described in these examples is not used, the melt indexes will normally be less than 0.01 $I_2$.

EXAMPLE 42

This example describes a series of ethylene polymerization runs in which the main heavy component was $VOCl_3$ and certain modifiers were added to the catalyst. These runs are all summarized in Table II which follows. These runs were carried out in a manner similar to Example 35 with modifications being shown in Table II. Water cooling of the reactor was used as necessary to keep the temperature below about 75° C. These runs are summarized in Table II as follows:

TABLE II

| Run number | Millimoles BDCAM[1] | Millimoles VOCl₃ | Millimoles H₂O | Modifier | Millimoles modifier | Reaction Time, minutes | Reaction Temp., °C. | Gram polymer | Remarks |
|---|---|---|---|---|---|---|---|---|---|
| a | 0.5 | 0.05 | 0.10 | SnCl₂ | 0.05 | 10 | 23–75 | | Solid polymer made. |
| b | 0.4 | 0.01 | 0.01 | | | 10 | 23–74 | | Do. |
| c | 0.4 | 0.01 | 0.02 | | | 20 | 23–63 | 36.7 | |
| d | 0.5 | 0.05 | | ZnCl₂ | 0.05 | 10 | 23–70 | 70.6 | |
| e | 0.4 | 0.01 | | Thiophene | 0.01 | 10 | 23–80 | 65.5 | |
| f | 0.4 | 0.01 | | do | 0.0233 | 10 | 25–63 | 47.0 | |
| g | 1.0 | 0.1 | | φ₃P[2] | 0.1 | 30 | 24–78 | 74.1 | |

[1] BDCAM=Bis(dichloroaluminum)methane.
[2] φ₃P=Triphenylphosphine.

EXAMPLE 43

This example describes the preparation by electrolysis of a solution of bis(dichloroaluminum)methane and an analysis of the solution. To a glass electrolysis cell was added 564.4 g. of pre-electrolysis solution prepared as in Example 10 or 11 containing 5 millimoles of Cl₂AlOH per liter of solution with 2.88 Cl⁻/Al ratio. The solution was saturated with ethylene and electrolyzed for 40 minutes at 0.5 amps with steady state voltage of 185–195 volts. Ethylene was continuously bubbled through the cell during electrolysis. After electrolysis was complete, the bis(dichloroaluminum)methane solution was transferred to a 500 ml. flask under nitrogen. The mixture was refluxed for about 30 minutes to drive off excess ethylene and any HCl if present. During electrolysis 12.21 millifaradays of current were passed and 0.3377 g. (12.51 millig. atom) of aluminum was lost from the anode. This corresponds to 1.03 g. atom of Al/F. The weight of these cathodes remained unchanged. Weight fractions of the solution were analyzed for Cl⁻, Al—C bonds and Al.

*Analysis.*—Calc'd for Al₂CH₂Cl₄: Al, 0.10%; Al—C bonds, 12.51 milliequivalents; Cl⁻, 30.75 milliequivalents. Found: Al, 0.09%; Al—C bonds, 12.01, 11.77 milliequivalents; Cl⁻, 30.00, 30.00 milliequivalents. The Al and Cl⁻ analyses include the Cl₂AlOH electrolyte in the solution. The structure of =AlCH₂Al= was established by decomposition of the bis(dichloroaluminum)methane solution with CH₃OD to give H₂CD₂. The aluminum carbon bonds were analyzed by the method of S. A. Bartkiewicz and J. W. Robinson, Anal. Chim. Acta., 20, 326 (1959), with solvent for the iodine being dichloromethane rather than benzene.

EXAMPLE 44

This example describes the polymerization of vinyl chloride using a bis(dichloroaluminum)methane and dodecyloxytitanium trichloride catalyst. To the polymerization vessel was added 45 ml. bis(dichloroaluminum)methane solution in methylene dichloride (1 millimole of the aluminum compound) and 3.2 ml. of dodecyloxytitanium trichloride (1 millimole in methylene dichloride). Then 25 ml. of vinyl chloride was added to the polymerization vessel. The molar ratio of titanium compound to aluminum compound is 1:1. After five hours, methanol was added to the reaction mixture which was stripped to remove solvent. The residue, after the solvent removal, was washed with hexane leaving a solid polymer. An infrared examination of the sample of this polymer indicated that it was similar to polyvinyl chloride (film). The softening point of the polymer was around 90° C.

EXAMPLE 45

This example describes the polymerization of ethylene using molybdenum acetyl acetonate,

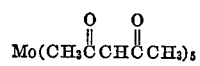

as the heavy metal component of the catalyst. To the reactor was charged 500 ml. of hexane. To the complexer was charged 70 ml. of bis(dichloroaluminum)methane (2 millimoles) and 0.118 g. of molybdenum acetyl acetonate with 10 ml. of hexane. The mixture of catalyst components was stirred together for five minutes then charged to the reactor. An additional 500 ml. of hexane was charged to the reactor and the reactor was pressured to 70 p.s.i.g. with ethylene. Polymerization run time was ½ hour after which time the reactor was cooled, vented and the contents dumped. From the reaction mixture was recovered 2.4 g. of solid polyethylene and 10.8 g. of liquid oily polyethylene.

EXAMPLE 46

This example describes the polymerization of ethylene using titanyl acetyl acetonate

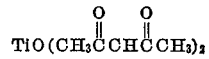

as the heavy metal component of the catalyst. To the reactor was charged 500 ml. of hexane and to the complexer was charged 100 ml. of bis(dichloroaluminum)methane (2 millimoles) and 2.5 ml. (0.2 millimole) of titanyl acetyl acetonate. After five minutes of complexing, the catalyst mixture was added to the polymerization vessel and 500 ml. of additional hexane was added to the polymerization vessel. The reactor was pressured to 70 p.s.i.g. with ethylene and polymerization was continued for one hour after which time the reactor was cooled, vented and dumped. The product was worked up and recovered in the usual manner. The product was 5.2 g. of solid polyethylene plus a trace of oily or liquid polyethylene.

EXAMPLE 47

This example describes the use of cobalt acetyl acetonate in the polymerization of ethylene. To the reactor was charged 500 ml. of hexane and to the complexer was charged 90 ml. (2 millimoles) of bis(dichloroaluminum)methane and 4 ml. (0.2 millimole) of cobalt acetyl acetonate

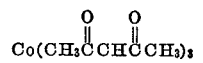

The catalyst mixture was stirred in the complexer for five minutes and then charged to the reactor. An additional 500 ml. of hexane was also charged to the reactor. The reactor was pressured to 70 p.s.i.g. with ethylene and the polymerization was allowed to continue for one hour. After the hour of polymerization, the reactor was cooled, vented and the reaction mixture dumped. The reaction mixture was worked up and the polymer recovered in the usual fashion. Yield of polymer was 10.6 g. of solid polyethylene.

EXAMPLE 48

This example describes the polymerization of ethylene using zirconium acetyl acetonate

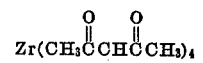

as the heavy metal compounds of the catalyst. To the reactor was charged 500 ml. of hexane and to the complexer 100 ml. (2 millimoles) of bis(dichloroaluminum) methane and 0.097 g. (0.2 millimole) of zirconium acetyl acetonate. The mixed catalyst components were stirred for five minutes in the complexer and then charged to the reactor. Also charged to the reactor was an additional 500 ml. of hexane. The reactor was pressured to 70 p.s.i.g. with ethylene and polymerization continued for 90 minutes after which time the reactor was cooled, vented and dumped. The reaction mixture was worked up in the usual fashion and the product recovered. Yield of solid polyethylene was 38.6 g.

EXAMPLE 49

This example describes the use of nickel acetyl acetonate

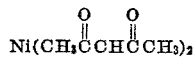

as the heavy metal component of the catalyst. To the reactor was charged 500 ml. of hexane and to the complexer 75 ml. (2 millimoles) of bis(dichloroaluminum) methane and 0.051 g. (0.2 millimole) of nickel acetyl acetonate. The catalyst components in the complexer were stirred for five minutes and then added to the reactor. Also added to the reactor was 500 additional ml. of hexane. The reactor was pressured to 72 p.s.i.g. with ethylene. The temperature in the reactor rose steadily to 70° C. due to the exothermic heat of polymerization. At 30 minutes, uptake of oxygen was still good but the reactor was cooled, vented and the reaction mixture dumped. The reactor was washed with 300 ml. of hexane. No solids were found in the reaction mixture. The reaction mixture, a solution, was shaken first with water containing a little HCl and then with two separate portions of distilled water. The organic product layer was dried overnight over magnesium sulfate. The dried solution was filtered from the magnesium sulfate and distilled to separate the product into five liquid fractions plus a residue fraction which was distilled at reduced pressure. Analysis of these fractions indicated that compounds had been made having from 4 to 20 carbon atoms. Weight of the 7 fractions, including the residue, mounted to 35.4 g. The extra liquid fraction was from the distillation under vacuum of the residue.

Although the invention has been described in terms of specified embodiments which are set forth in considerable detail, it should be understood that this is by way of illustration only and that the invention is not limited thereto since alternative embodiments and operating techniques will become apparent to those skilled in the art in view of the disclosure. Accordingly, modifications are contemplated which can be made without departing from the spirit of the described invention.

The embodiments of the invention in which an exclusive property or privilege is claimed are defined as follows:

1. A process for polymerization which comprises polymerizing an ethylenically unsaturated compound in the presence of a catalyst consisting essentially of a mixture of (1) a compound of the formula $X_nMCH_2MX_n$ wherein M is boron or a Group II, III-A, or IV-A metal of the Periodic Table, X is a halogen atom and $n$ is one less than the valence of M and (2) a compound of a transition metal of Groups III-B, IV-B, V-B, VI-B, VII-B, VIII or I-B of the Periodic Table in proportions such that the molar ratio of Compound 1 to Compound 2 lies in the range from about 0.3:1 to about 200:1.

2. A process of claim 1 wherein an electron-donating compound has been added to the catalyst in a sufficient amount to modify the catalyst activity but insufficient to kill the catalyst activity.

3. A process of claim 2 wherein the electron donating compound is water.

4. A process of claim 1 wherein the polymerization is carried out in the presence of an inert organic solvent.

5. A process of claim 1 wherein the polymerization is carried out in the presence of a sufficient amount of hydrogen to modify the polymer properties.

6. A process of claim 1 wherein said ethylenically unsaturated compound is ethylene.

7. A process of claim 6 wherein the polymerization is carried out in the presence of a sufficient amount of hydrogen to modify the polymer properties.

8. A process of claim 1 wherein ethylene is polymerized and said catalyst is a mixture of $Cl_2AlCH_2AlCl_2$ and titanium tetrachloride.

9. A process of claim 8 wherein a sufficient amount of an electron donating compound has been added to modify the catalyst activity.

10. A process of claim 9 wherein a sufficient amount of water based on the titanium compound has been added to promote the catalyst activity.

11. A process of claim 1 wherein ethylene is polymerized and said catalyst is a mixture of $Cl_2AlCH_2AlCl_2$ and vanadium oxychloride.

12. A process of claim 11 wherein the electron donating compound is water.

13. A process of claim 1 wherein butadiene-1,3 is polymerized and said catalyst is a mixture of $Cl_2AlCH_2AlCl_2$ and titanium tetraiodide.

14. A process of claim 1 wherein vinyl chloride is polymerized, (1) is $Cl_2AlCH_2AlCl_2$ and (2) is dodecyloxytitanium trichloride.

References Cited

UNITED STATES PATENTS 3,684,739   8/1972   Mottus _____ 252—429 A

JOSEPH L. SCHOFER, Primary Examiner

J. KNIGHT III, Assistant Examiner

U.S. Cl. X.R.

252—4290; 260—636, 78.5 R, 80 C, 82.1, 85.5 M, 87.5 R, 88.2 B, 88.7 C, 89.5 R, 89.7 R, 91.1 A, 92.8 W, 94.3, 94.9 B, CA, CB

UNITED STATES PATENT OFFICE
CERTIFICATE OF CORRECTION

Patent No. 3,787,383        Dated January 22, 1974

Inventor(s) Edward H. Mottus et al

It is certified that error appears in the above-identified patent and that said Letters Patent are hereby corrected as shown below:

Column 8, line 24, for "$Cl_3AlOH \xrightarrow{-electron} Cl_2AlOH + Cl^{\cdot} Cl^{\cdot} + Al \longrightarrow AlCl$"

read -- $Cl_3AlOH \xrightarrow{-electron} Cl_2AlOH + Cl^{\cdot}$ $Cl^{\cdot} + Al \longrightarrow AlCl$ -- .

Column 8, line 34, for "$Cl_2AlOH + ClCH_2 + (CH_2Cl_2)_{n-1}\ 2ClCH_2 \longrightarrow ClCH_2CH_2Cl$"

read -- $Cl_2AlOH + ClCH_2^{\cdot} + (CH_2Cl_2)_{n-1}$ $2ClCH_2^{\cdot} \longrightarrow ClCH_2CH_2Cl$ -- .

Column 11, line 7, for "$Thcl_3$" read -- $ThCl_3$ -- .

Column 16, line 72, for "complexers" read -- complexer -- .

Column 19, line 59, for "melting" read -- melted -- .

Column 21, line 56, for "but" read -- tube -- .

Column 23, line 2, for "$TiCl_4/Ch_2Cl_2$" read -- $TiCl_4/CH_2Cl_2$ -- .

Column 24, line 16, for "mixtures" read -- mixture -- .

Column 26, line 59, for "having a" read -- having -- .

UNITED STATES PATENT OFFICE
CERTIFICATE OF CORRECTION

Patent No. 3,787,383  Dated January 22, 1974

Inventor(s) Edward H. Mottus et al     - 2 -

It is certified that error appears in the above-identified patent and that said Letters Patent are hereby corrected as shown below:

Column 31, line 43, Column 31, line 48, and Column 32, line 34, for "VOCL$_3$" read -- VOCl$_3$ -- .

Column 31, line 72, for "toneate" read -- tonate -- .

Signed and sealed this 5th day of November 1974.

(SEAL)
Attest:

McCOY M. GIBSON JR.
Attesting Officer

C. MARSHALL DANN
Commissioner of Patents